US012577419B2

(12) United States Patent
Yoshida et al.

(10) Patent No.: US 12,577,419 B2
(45) Date of Patent: Mar. 17, 2026

(54) FINE-METAL-PARTICLE-CONTAINING INK

(71) Applicant: KAO CORPORATION, Tokyo (JP)

(72) Inventors: Tomohide Yoshida, Wakayama (JP);
Kosuke Muto, Wakayama (JP)

(73) Assignee: KAO CORPORATION, Tokyo (JP)

( * ) Notice: Subject to any disclaimer, the term of this
patent is extended or adjusted under 35
U.S.C. 154(b) by 177 days.

(21) Appl. No.: 18/258,238

(22) PCT Filed: Dec. 10, 2021

(86) PCT No.: PCT/JP2021/045539
§ 371 (c)(1),
(2) Date: Jun. 19, 2023

(87) PCT Pub. No.: WO2022/138235
PCT Pub. Date: Jun. 30, 2022

(65) Prior Publication Data
US 2024/0034896 A1 Feb. 1, 2024

(30) Foreign Application Priority Data

Dec. 22, 2020 (JP) ................................ 2020-212914

(51) Int. Cl.
| | |
|---|---|
| *C09D 11/322* | (2014.01) |
| *B22F 1/0545* | (2022.01) |
| *B22F 1/107* | (2022.01) |
| *B22F 1/142* | (2022.01) |
| *B22F 9/24* | (2006.01) |
| *B41J 2/01* | (2006.01) |
| *B41J 2/21* | (2006.01) |

(Continued)

(52) U.S. Cl.
CPC .......... *C09D 11/322* (2013.01); *B22F 1/0545*
(2022.01); *B22F 1/107* (2022.01); *B22F 1/142*
(2022.01); *B22F 9/24* (2013.01); *B41J 2/01*
(2013.01); *B41J 2/2107* (2013.01); *C09D
11/106* (2013.01); *C09D 11/107* (2013.01);
*C09D 11/326* (2013.01); *C09D 11/52*
(2013.01); *H01B 1/22* (2013.01); *B22F
2301/255* (2013.01); *B22F 2304/054*
(2013.01); *B22F 2998/10* (2013.01)

(58) Field of Classification Search
CPC ........ B41J 25/001; B41J 25/34; B41J 25/003;
B41J 2/21; B41J 2/18; B41J 25/312;
B41J 2025/008; B41J 2202/21; B41J
2/17596; B41J 2/16508; B41J 2/1652;
B41J 2/16538; B41J 2/175; B41J
2/17563; B41J 29/02; B41J 2/17513;
B41J 2/17509; B41J 29/13; B41J
2/17553; B41J 2/1606; B41J 2/1642;
B41J 2/1609; B41J 2/1433; B41J 2/164;
B41J 2/162; B41J 2/161; B41J 2/19;
B41J 15/04; B41J 2/01; B41J 2/211;
B41J 2/17; B41J 2/17593; B41J 2/2107;
B41J 2/1755; B41J 2/2114; B41J 2/2117;
B41J 2/2056; B41J 2/0057; B41J 3/60;
B41J 2002/012; B41J 2/04598; B41J
2/04588; B41J 2/04595; B41J 2/04586;
B41J 2/14274; B41J 2/1623; B41J
2202/00; B41J 2202/03; B41J 2/14201;
B41J 2/045; B41J 11/0015; B41J 11/002;
B41J 2/04581; B41J 2/055; B41J
2002/16502; C09D 11/36; C09D 11/40;
C09D 11/30; C09D 11/38; C09D 11/32;
C09D 11/322; C09D 11/324; C09D
11/328; C09D 11/101; C09D 11/102;
C09D 11/005; C09D 11/54; C09D 11/52;
C09D 11/106; B41M 5/0011; B41M
5/0017; B41M 5/0023; B41M 5/0047;
B41M 7/00; B41M 7/0072; B41M 5/52;
B41M 5/5218; B41M 5/5227
See application file for complete search history.

(56) References Cited

U.S. PATENT DOCUMENTS

| | | | |
|---|---|---|---|
| 2008/0124238 A1* | 5/2008 | Atsuki | .................... C23C 26/00 |
| | | | 419/10 |
| 2008/0146680 A1 | 6/2008 | Sato et al. | |

(Continued)

FOREIGN PATENT DOCUMENTS

| | | |
|---|---|---|
| CN | 101291763 A | 10/2006 |
| CN | 101065203 A | 10/2007 |

(Continued)

OTHER PUBLICATIONS

Extended European Search Report issued Sep. 30, 2024 in European
Patent Application No. 21910384.3, 10 pgs.

(Continued)

*Primary Examiner* — Manish S Shah
(74) *Attorney, Agent, or Firm* — Oblon, McClelland,
Maier & Neustadt, L.L.P.

(57) ABSTRACT

A metallic fine particle-containing ink, including a metal
constituting the metallic fine particles comprising silver, the
metallic fine particles contained in the ink having a volume
average particle diameter $D_A$ of 20 nm or more and 50 nm
or less, and the metallic fine particles contained in the ink
having a ratio $(D_A/L_A)$ of the volume average particle
diameter $D_A$ with respect to a crystallite size $L_A$ (nm)
obtained from a (111) plane in powder X-ray diffractometry
of the metallic fine particles of 1.7 or more and 2.5 or less.

19 Claims, No Drawings

(51) Int. Cl.

| | |
|---|---|
| *C09D 11/106* | (2014.01) |
| *C09D 11/107* | (2014.01) |
| *C09D 11/326* | (2014.01) |
| *C09D 11/52* | (2014.01) |
| *H01B 1/22* | (2006.01) |

(56) References Cited

U.S. PATENT DOCUMENTS

| | | | |
|---|---|---|---|
| 2008/0260995 A1* | 10/2008 | Hirakoso | C09D 11/30 |
| | | | 106/1.23 |
| 2010/0283013 A1 | 11/2010 | Sato et al. | |
| 2012/0280186 A1 | 11/2012 | Sano et al. | |
| 2013/0264104 A1 | 10/2013 | Jeon et al. | |
| 2016/0243868 A1* | 8/2016 | Kung | B41M 5/44 |
| 2018/0002576 A1 | 1/2018 | Sasaki et al. | |
| 2018/0015547 A1* | 1/2018 | Okada | C09D 11/52 |
| 2021/0379654 A1 | 12/2021 | Yoshida et al. | |

FOREIGN PATENT DOCUMENTS

| | | | |
|---|---|---|---|
| CN | 104080561 | A | 10/2014 |
| JP | 2006-183072 | A | 7/2006 |
| JP | 2006-284947 | A | 10/2006 |
| JP | 2007-77479 | A | 3/2007 |
| JP | 2013-28859 | A | 2/2013 |
| JP | 2013-527877 | A | 7/2013 |
| JP | 2013-159805 | A | 8/2013 |
| JP | 2020-033635 | A | 3/2020 |
| JP | 2020-63507 | A | 4/2020 |
| JP | 2021-55127 | A | 4/2021 |
| WO | WO 2016/052292 | A1 | 4/2016 |
| WO | WO 2016/125737 | A1 | 8/2016 |

OTHER PUBLICATIONS

International Search Report issued Mar. 8, 2022, in PCT/JP2021/045539 (with English Translation), 7 pages.
European Office Action issued Sep. 8, 2025 in European Patent Application No. 21910384.3, 7 pages.

* cited by examiner

FINE-METAL-PARTICLE-CONTAINING INK

CROSS REFERENCE TO RELATED APPLICATIONS

This application is a National Stage entry under 35 U.S.C. § 371 of PCT/JP2021/045539, filed on Dec. 10, 2021, and claims priority to Japanese Patent Application No. 2020-212914, filed on Dec. 22, 2020. The entire contents of both are incorporated herein by reference.

FIELD OF THE INVENTION

The present invention relates to a metallic fine particle-containing ink, a method of producing the ink, a method of producing a printed matter using the ink, a method of producing a conductive composite material using the ink, and a device using the conductive composite material.

BACKGROUND OF THE INVENTION

Metallic fine particles can form a metal film having conductivity through sintering, and therefore have been used for forming a circuit and an electrode in various electronic components, bonding components, and the like.

For example, JP 2006-183072 A (PTL 1) intends to provide silver fine particles for a raw material of a conductive paste that exhibits sufficient conductivity at a sintering temperature of 200° C. or less, and a conductive paste containing the silver fine particles, and describes silver fine particles having an average particle diameter of primary particles of 40 to 350 nm, a crystallite diameter of 20 to 70 nm, and a ratio of the average particle diameter with respect to the crystallite diameter of 1 to 5, a conductive paste containing the silver fine particles, and the like.

WO 2016/125737 (PTL 2) intends to provide a thermal conductive paste using silver fine particles that has a high conductivity and an improved thermal conductivity while satisfying the demand of low temperature sintering at 300° C. or less, and the like, and describes a thermal conductive paste containing silver fine particles having an average particle diameter of primary particles of 40 to 350 nm, a crystallite diameter of 20 to 70 nm, and a ratio of the average particle diameter with respect to the crystallite diameter of 1 to 5, an aliphatic primary amine, and a compound having a phosphoric acid group, and the like.

SUMMARY OF THE INVENTION

The present invention relates to a metallic fine particle-containing ink, a metal constituting the metallic fine particles containing silver, the metallic fine particles contained in the ink having a volume average particle diameter $D_A$ of 20 nm or more and 50 nm or less, and the metallic fine particles contained in the ink having a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

DETAILED DESCRIPTION OF THE INVENTION

As one of the industrial deployments of metallic fine particles, an ink containing metallic fine particles has been investigated to apply to the printed electronics forming electronic circuits and electronic devices using printing technique. In the practical realization of electronic circuits and electronic devices produced by the printed electronics, there is a demand of the formation of a metal film that has a low volume resistivity and a small fluctuation in volume resistivity caused by temperature change, for securing the capability and the reliability of the electronic circuits and the electronic devices.

The ink containing metallic fine particles is necessarily stored under refrigeration in view of the dispersion stability of the metallic fine particles, and therefore the workability in using the ink may be deteriorated in some cases, resulting in a demand of excellent storage stability under an environment at ordinary temperature (25° C.) or more.

However, in the techniques of PTLs 1 and 2, the metal film formed by sintering the metallic fine particles is still not sufficiently low in volume resistivity, is not sufficiently suppressed in fluctuation in volume resistivity caused by temperature change, and fails to satisfy the demand of storage stability.

The present invention relates to a metallic fine particle-containing ink that is excellent in storage stability and is capable of forming a metal film that has a low volume resistivity and a small fluctuation in volume resistivity caused by temperature change, a method of producing the ink, a method of producing a printed matter using the ink, a method of producing a conductive composite material using the ink, and a device using the conductive composite material.

The present inventors have focused on the fact that the dispersion stability of the metallic fine particles can be enhanced, and a favorable metal film can be formed, in such a manner that the metal constituting the metallic fine particles contained in the ink contains silver, and the volume average particle diameter of the metallic fine particles and the ratio of the volume average particle diameter of the metallic fine particles with respect to the crystallite size obtained from the MO plane in powder X-ray diffractometry of the metallic fine particles are regulated to the prescribed ranges, and have found that a metallic fine particle-containing ink that is excellent in storage stability and is capable of forming a metal film that has a low volume resistivity and a small fluctuation in volume resistivity caused by temperature change, a method of producing the ink, a method of producing a printed matter using the ink, a method of producing a conductive composite material using the ink, and a device using the conductive composite material can be provided thereby.

Specifically, the present invention relates to the following items [1] to [5].

[1] A metallic fine particle-containing ink, a metal constituting the metallic fine particles containing silver, the metallic fine particles contained in the ink having a volume average particle diameter $D_A$ of 20 nm or more and 50 nm or less, and the metallic fine particles contained in the ink having a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

[2] A method of producing the metallic fine particle-containing ink according to the item [1], including the following steps 1 to 3:

step 1: a step of reducing a metal raw material compound at 5° C. or more and 90° C. or less, step 2: a step of freeze-drying a reduced product obtained in the step 1, and step 3: a step of storing a freeze-dried product obtained in the step 2 at 0° C. or more and 70° C. or less for 1 hour or more and 48 hours or less.

[3] A method of producing a printed matter, including printing the metallic fine particle-containing ink according to the item [1] on a substrate, so as to provide a printed matter including the substrate having a metal film formed thereon.

[4] A method of producing a conductive composite material, including printing the metallic fine particle-containing ink according to the item [1] on a substrate, so as to provide a conductive composite material including the substrate and a metal film.

[5] A device including a conductive composite material obtained by the production method according to the item [4].

In accordance with the present invention, it is possible to provide a metallic fine particle-containing ink that is excellent in storage stability and is capable of forming a metal film that has a low volume resistivity and a small fluctuation in volume resistivity caused by temperature change, a method of producing the ink, a method of producing a printed matter using the ink, a method of producing a conductive composite material using the ink, and a device using the conductive composite material.

[Metallic Fine Particle-Containing Ink]

The metallic fine particle-containing ink of the present invention is an ink containing metallic fine particles, in which the metal constituting the metallic fine particles contains silver, the metallic fine particles contained in the ink have a volume average particle diameter $D_A$ of 20 nm or more and 50 nm or less, and the metallic fine particles contained in the ink have a ratio $(D_A/L_A)$ of the volume average particle diameter $D_A$ with respect to the crystallite size $L_A$ (nm) obtained from the (111) plane in powder X-ray diffractometry of the metallic fine particles of 1.6 or more and 3.1 or less.

The metallic fine particles contained in the ink of the present invention may be hereinafter referred to as "metallic fine particles A".

The present invention exhibits an effect of providing excellent storage stability and forming a metal film that has a low volume resistivity and a small fluctuation in volume resistivity caused by temperature change. The reason therefor is not clear, but can be considered as follows.

It is considered that the metallic fine particles contained in the ink of the present invention are suppressed in aggregation based on the DLVO theory since the metal constituting the metallic fine particles contains silver, and the volume average particle diameter thereof is the prescribed value or more, and the gravitational precipitation thereof is suppressed to enhance the dispersion stability of the metallic fine particles since the volume average particle diameter thereof is the prescribed value or less. Furthermore, it is considered that the metallic fine particles contained in the ink of the present invention has a ratio of the volume average particle diameter with respect to the crystallite size within the prescribed range, and thereby have a relatively large crystallite size of the metallic fine particles, which reduces the unstable crystal interface, resulting in the further enhancement of the dispersion stability of the metallic fine particles. It is considered that the synergistic effect on the dispersion stability of the metallic fine particles enhances the storage stability thereof.

In the present invention, while the metallic fine particles have a polycrystalline structure constituted by plural crystallites, it is considered that since the ratio of the volume average particle diameter with respect to the crystallite size of the metallic fine particles is in the prescribed range, and the crystallite size showing the extent of the crystal growth of the metallic fine particles is regulated, the metal crystal of the metal film formed can be regulated to a certain range to prevent strain from being accumulated in the metal film, resulting in the suppression of defects, such as cracks, in the metal film, and as a result, the volume resistivity can be reduced, and the fluctuation in volume resistivity caused by temperature change can be suppressed.

In the case where ink-jet printing is used as the printing method, there is a demand of the enhancement of the vetting stability, i.e., the ink can be stably jetted even after a prescribed period of time elapsing while not discharging the ink from the nozzle. It is considered that the ink of the present invention is enhanced in jetting stability of the ink in ink-jet printing due to the synergistic effect on the dispersion stability of the metallic fine particles described above.

<Metallic Fine Particles A>

The metal (metal atoms) constituting the metallic fine particles A contains silver.

The content of silver in the metal (metal atoms) constituting the metallic fine particles A is preferably 80% by mass or more, more preferably 90% by mass or more, further preferably 95% by mass or more, still further preferably 98% by mass or more, and still more further preferably substantially 100% by mass, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The expression "substantially 100% by mass" herein means that a component that is unintentionally contained may be contained. Examples of the component that is unintentionally contained include an unavoidable impurity.

The metal (metal atoms) constituting the metallic fine particles A may contain a metal other than silver in such a range that does not impair the effect of the present invention. Examples of the metal other than silver include a Group 4 transition metal, such as titanium and zirconium; a Group 5 transition metal, such as vanadium and niobium; a Group 6 transition metal, such as chromium, molybdenum, and tungsten; a Group 7 transition metal, such as manganese, technetium, and rhenium; a Group 8 transition metal, such as iron and ruthenium; a Group 9 transition metal, such as cobalt, rhodium, and iridium; a Group 10 transition metal, such as nickel, palladium, and platinum; a Group 11 transition metal, such as copper and gold; a Group 12 transition metal, such as zinc and cadmium; a Group 13 metal, such as aluminum, gallium, and indium; and a Group 14 metal, such as germanium, tin, and lead. The kinds of the metals can be confirmed by the high frequency induction coupled plasma emission spectroscopy.

The volume average particle diameter $D_A$ of the metallic fine particles A is nm or more, preferably 21 nm or more, and more preferably 22 nm or more, and is 50 nm or less, preferably 48 nm or less, and more preferably 47 nm or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The crystallite size $L_A$ (nm) obtained from the (111) plane in powder X-ray diffractometry of the metallic fine particles A is preferably 5 nm or more, more preferably 7 nm or more, and further preferably 8 nm or more, and is preferably nm or less, more preferably 28 nm or less, and further preferably 27 nm or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The ratio ($D_A/L_A$) of the volume average particle diameter $D_A$ (nm) with respect to the crystallite size $L_A$ (nm) of the metallic fine particles A is 1.6 or more, preferably 1.7 or more, and more preferably 1.73 or more, and is 3.1 or less, preferably 3.0 or less, more preferably 2.7 or less, further preferably 2.5 or less, still further preferably 2.3 or less, and still more further preferably 2.1 or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The volume average particle diameter $D_A$ and the crystallite size $L_A$ can be regulated by the kind and the amount of the metal constituting the metallic fine particles A, the kind and the amount of a dispersant B used depending on necessity, the production condition of the metallic fine particles A (such as the temperature of the reduction reaction in the case where the metallic fine particles A are obtained through reduction of a metal raw material compound), and the like. The volume average particle diameter $D_A$ and the crystallite size $L_A$ are measured according to the methods described in the examples.

The content of the metallic fine particles A in the ink of the present invention is preferably 2% by mass or more, more preferably 5% by mass or more, further preferably 10% by mass or more, still further preferably 15% by mass or more, and still more further preferably 20% by mass or more, from the standpoint of the reduction of the volume resistivity, and the standpoint of the reduction of the fluctuation in volume resistivity caused by temperature change, and is preferably 85% by mass or less, more preferably 70% by mass or more, further preferably 50% by mass or less, and still further preferably 40% by mass or less, from the standpoint of the enhancement of the dispersion stability of the metallic fine particles, resulting in the enhancement of the storage stability and the jetting stability of the ink.

<Dispersant B>

The metallic fine particles A according to the present invention are preferably dispersed with a dispersant B from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The dispersant B is not particularly limited, as far as having a function of dispersing the metallic fine particles, such as a surfactant and a polymer, and is preferably a polymer (which may be hereinafter referred to as a "polymer b"). The polymer b is preferably a polymer containing a hydrophilic group. The polymer b preferably has the hydrophilic group on the side chain thereof.

Examples of the hydrophilic group include an anionic group, for example, a group exhibiting acidity by releasing a hydrogen ion through dissociation, such as a carboxy group (—COOM), a sulfonic acid group (—$SO_3$M), and a phosphoric acid group (—$OPO_3M_2$), and ionic forms thereof formed through dissociation, (such as —COO⁻, —$SO_3^-$, —$OPO_3^{2-}$, and —$OPO_3^-$M); a cationic group, for example, a protonic acid group, such as a primary, secondary, or tertiary amino group, and a quaternary ammonium group; and a nonionic group, such as a polyoxyalkylene group, a hydroxy group, and an amido group. In the chemical formulae above, M represents a hydrogen atom, an alkali metal, ammonium, or an organic ammonium.

In the case where the polymer b has an anionic group, the anionic group is preferably a carboxy group. In this case, examples of the basic structure of the polymer b include a vinyl-based polymer, such as an acrylic-based resin, a styrene-based resin, a styrene-acrylic-based resin, and an acrylic silicone-based resin; and a condensation-based polymer, such as a polyester and a polyurethane.

In the case where the polymer b has a nonionic group, examples of the polymer b include a polymer having a polyoxyalkylene group, a polymer having a structure derived from vinylpyrrolidone, such as polyvinylpyrrolidone, a polymer having a structure derived from acrylamide, such as polyacrylamide, and a polyvinyl alcohol.

The polymer b preferably has at least one kind selected from the group consisting of a carboxy group and a polyoxyalkylene group from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The polymer b is preferably a vinyl-based polymer containing at least one kind of a constitutional unit selected from the group consisting of a constitutional unit derived from a monomer (b-1) having a carboxy group and a constitutional unit derived from a monomer (b-2) having a polyoxyalkylene group from the same standpoint as above.

In the case where the vinyl-based polymer is a copolymer, the vinyl-based polymer may be any of a block copolymer, a random copolymer, and an alternating copolymer.

[Monomer (b-1) Having Carboxy Group]

Specific examples of the monomer (b-1) include an unsaturated monocarboxylic acid, such as (meth)acrylic acid, crotonic acid, and 2-methacryloyloxymethyl succinate; and an unsaturated dicarboxylic acid, such as maleic acid, itaconic acid, fumaric acid, and citraconic acid. The unsaturated dicarboxylic acid may be an anhydride.

One kind of the monomer (b-1) may be used alone, and two or more kinds thereof may be used in combination.

The monomer (b-1) is preferably at least one kind selected from the group consisting of (meth)acrylic acid and maleic acid from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the description herein, the "(meth)acrylic acid" means at least one kind selected from the group consisting of acrylic acid and methacrylic acid. The "(meth)acrylic acid" in the following description has the same meaning.

[Monomer (b-2) Having Polyoxyalkylene Group]

The monomer (b-2) is preferably a monomer capable of introducing a polyoxyalkylene group to the side chain of the vinyl-based polymer from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. Examples of the monomer (b-2) include a polyalkylene glycol (meth)acrylate, an alkoxypolyalkylene glycol (meth)acrylate, and a phenoxypolyalkylene glycol (meth) acrylate. One kind of the monomer (b-2) may be used alone, or two or more kinds thereof may be used in combination.

In the description herein, the "(meth)acrylate" means at least one kind selected from the group consisting of acrylate and methacrylate. The "(meth)acrylate" in the following description has the same meaning.

The monomer (b-2) is preferably at least one kind selected from the group consisting of a polyalkylene glycol (meth) acrylate and an alkoxypolyalkylene glycol (meth)acrylate, and more preferably an alkoxypolyalkylene glycol (meth) acrylate, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The number of carbon atoms of the alkoxy group of the alkoxypolyalkylene glycol (meth)acrylate is preferably 1 or more and 8 or less, and more preferably 1 or more and 4 or less.

The polyalkylene glycol (meth)acrylate is preferably at least one kind selected from the group consisting of polyethylene glycol (meth)acrylate and (polyethylene glycol/ polypropylene glycol) (meth)acrylate from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The alkoxypolyalkylene glycol (meth)acrylate is preferably at least one kind selected from the group consisting of an alkoxypolyethylene glycol (meth)acrylate and an alkoxy (polyethylene glycol/polypropylene glycol) (meth)acrylate, and more preferably at least one kind selected from the group consisting of an alkoxypolyethylene glycol (meth) acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms, from the same standpoint as above.

Specific examples of the alkoxypolyethylene glycol (meth)acrylate include methoxypolyethylene glycol (meth) acrylate, ethoxypolyethylene glycol (meth)acrylate, propoxypolyethylene glycol (meth)acrylate, butoxypolyethylene glycol (meth)acrylate, and octoxypolyethylene glycol (meth)acrylate.

Specific examples of the alkoxy(polyethylene glycol/ polypropylene glycol) (meth)acrylate include methoxy (polyethylene glycol/polypropylene glycol) (meth)acrylate, ethoxy(polyethylene glycol/polypropylene glycol) (meth) acrylate, propoxy(polyethylene glycol/polypropylene glycol) (meth)acrylate, butoxy(polyethylene glycol/polypropylene glycol) (meth)acrylate, and octoxy(polyethylene glycol/polypropylene glycol) (meth)acrylate.

The polyoxyalkylene group of the monomer (b-2) preferably contains a unit derived from an alkylene oxide having 2 or more and 4 or less carbon atoms from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. Examples of the alkylene oxide include ethylene oxide, propylene oxide, and butylene oxide. Among these, the polyoxyalkylene group of the monomer (b-2) more preferably contains at least one kind selected from the group consisting of a unit derived from ethylene oxide and a unit derived from propylene oxide, and further preferably contains a unit derived from ethylene oxide.

The number of the unit derived from an alkylene oxide in the polyoxyalkylene group is preferably 2 or more, and more preferably 5 or more, and is preferably 100 or less, more preferably 70 or less, further preferably 50 or less, and still further preferably 40 or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The polyoxyalkylene group may be a copolymer containing a unit derived from ethylene oxide and a unit derived from propylene oxide. The molar ratio (EO/PO) of the unit (EO) derived from ethylene oxide and the unit (PO) derived from propylene oxide is preferably 60/40 or more, more preferably 65/35 or more, and further preferably 70/30 or more, and is preferably 90/10 or less, more preferably 85/15 or less, and further preferably 80/20 or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The copolymer containing a unit derived from ethylene oxide and a unit derived from propylene oxide may be any of a block copolymer, a random copolymer, and an alternating copolymer.

The monomer (b-2) is preferably at least one kind selected from the group consisting of polyethylene glycol (meth) acrylate, (polyethylene glycol/polypropylene glycol) (meth) acrylate, an alkoxypolyethylene glycol (meth)acrylate having an alkoxy group having 1 or more and 4 or less carbon atoms, and an alkoxy(polyethylene glycol/polypropylene glycol) (meth)acrylate having an alkoxy group having 1 or more and 8 or less carbon atoms, and more preferably at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth) acrylate having an alkoxy group having 1 or more and 8 or less carbon atoms, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

Specific examples of the monomer (b-2) that is commercially available include NK Ester AM-90G, NK Ester AM-130G, NK Ester AMP-20GY, NK Ester M-20G, NK Ester M-40G, NK Ester M-90G, and NK Ester M-230G, all available from Shin-Nakamura Chemical Co., Ltd., and Blemmer PE-90, Blemmer PE-200, Blemmer PE-350, and the like, Blemmer PME-100, Blemmer PME-200, Blemmer PME-400, Blemmer PME-1000, Blemmer PME-4000, and the like, Blemmer PP-500, Blemmer PP-800, Blemmer PP-1000, and the like, Blemmer AP-150, Blemmer AP-400, Blemmer AP-550, and the like, Blemmer 50PEP-300, Blemmer 50POEP-800B, and Blemmer 43PAPE-600B, all available from NOF Corporation.

[Hydrophobic Monomer (b-3)]

The polymer b is preferably a vinyl-based polymer containing a constitutional unit derived from a hydrophobic monomer (b-3), in addition to at least one kind selected from the group consisting of a constitutional unit derived from the monomer (b-1) having a carboxy group and a constitutional unit derived from the monomer (b-2) having a polyoxyalkylene group, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the description herein, the "hydrophobic monomer" means that in the case where the monomer is dissolved in 100 g of ion exchanged water at 25° C. to reach saturation, the dissolved amount thereof is less than 10 g.

Examples of the hydrophobic monomer (b-3) include an aromatic group-containing monomer and a (meth)acrylate having a hydrocarbon group derived from an aliphatic alcohol.

The aromatic group-containing monomer is preferably a vinyl monomer having an aromatic group having 6 or more and 22 or less carbon atoms, which may have a substituent containing a hetero atom, and more preferably at least one kind selected from the group consisting of a styrene-based monomer and an aromatic group-containing (meth)acrylate, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The molecular weight of the aromatic group-containing monomer is preferably less than 500.

Examples of the styrene-based monomer include styrene and a styrene derivative, such as styrene, α-methylstyrene, 2-methylstyrene, 4-vinyltoluene (4-methylstyrene), and divinylbenzene (vinylstyrene). Among these, styrene and α-methylstyrene are preferred from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The aromatic group-containing (meth)acrylate is preferably phenyl (meth)acrylate, benzyl (meth)acrylate, phenoxyethyl (meth)acrylate, and the like, and more preferably benzyl (meth)acrylate, from the same standpoints as above.

The (meth)acrylate having a hydrocarbon group derived from an aliphatic alcohol preferably has a hydrocarbon group derived from an aliphatic alcohol having 1 or more and 22 or less carbon atoms from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. Examples thereof include a (meth) acrylate having a linear alkyl group, such as methyl (meth) acrylate, ethyl (meth)acrylate, propyl (meth)acrylate, butyl (meth)acrylate, pentyl (meth)acrylate, octyl (meth)acrylate, decyl (meth)acrylate, dodecyl (meth)acrylate, and stearyl (meth)acrylate; a (meth)acrylate having a branched alkyl group, such as isopropyl (meth)acrylate, isobutyl (meth) acrylate, tert-butyl (meth)acrylate, isopentyl (meth)acrylate, isooctyl (meth)acrylate, isodecyl (meth)acrylate, isododecyl (meth)acrylate, isostearyl (meth)acrylate, and 2-ethylhexyl (meth)acrylate; and a (meth)acrylate having an alicyclic alkyl group, such as cyclohexyl (meth)acrylate.

One kind of the monomer (b-3) may be used alone, or two or more kinds thereof may be used in combination.

The monomer (b-3) is preferably an aromatic group-containing monomer, more preferably a styrene-based monomer, further preferably at least one kind selected from the group consisting of styrene and a styrene derivative, still further preferably at least one kind selected from the group consisting of styrene, α-methylstyrene, 2-methylstyrene, and 4-vinyltoluene (4-methylstyrene), and still further preferably at least one kind selected from the group consisting of styrene and α-methylstyrene, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The polymer b preferably contains at least one kind selected from the group consisting of a homopolymer consisting of a constitutional unit derived from the monomer (b-1), and a copolymer containing at least one kind of a constitutional unit selected from the group consisting of a constitutional unit derived from the monomer (b-1) having a carboxy group and a constitutional unit derived from the monomer (b-2) having a polyoxyalkylene group, more preferably contains at least one kind selected from the group consisting of a homopolymer consisting of a constitutional unit derived from the monomer (b-1), a copolymer containing a constitutional unit derived from the monomer (b-2) and a constitutional unit derived from the monomer (b-3), and a copolymer containing a constitutional unit derived from the monomer (b-1), a constitutional unit derived from the monomer (b-2), and a constitutional unit derived from the monomer (b-3), further preferably contains at least one kind selected from the group consisting of a copolymer containing a constitutional unit derived from the monomer (b-2) and a constitutional unit derived from the monomer (b-3), and a copolymer containing a constitutional unit derived from the monomer (b-1), a constitutional unit derived from the monomer (b-2), and a constitutional unit derived from the monomer (b-3), and still further preferably contains a copolymer containing a constitutional unit derived from the monomer (b-1), a constitutional unit derived from the monomer (b-2), and a constitutional unit derived from the monomer (b-3) (all of which are generically referred to as a vinyl-based polymer (b-I) component), from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of the preferred vinyl-based polymer (b-I) component in the polymer b is preferably 80% by mass or more, more preferably 90% by mass or more, further preferably 95% by mass or more, still further preferably 98% by mass or more, and still more further preferably substantially 100% by mass, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The expression "substantially 100% by mass" herein means that a component that is unintentionally contained may be contained. The component that is unintentionally contained means, for example, that a polymer b component other than the vinyl-based polymer contained in the vinyl-based polymer may be contained.

The polymer b preferably contains a vinyl-based polymer containing at least one kind of a constitutional unit selected from the group consisting of a constitutional unit derived from at least one kind selected from the group consisting of (meth)acrylic acid and maleic acid as the monomer (b-1), and a constitutional unit derived from at least one kind selected from the group consisting of polyethylene glycol (meth)acrylate, (polyethylene glycol/polypropylene glycol) (meth)acrylate, an alkoxypolyethylene glycol (meth)acrylate having an alkoxy group having 1 or more and 4 or less carbon atoms, and an alkoxy(polyethylene glycol/polypropylene glycol) (meth)acrylate having an alkoxy group having 1 or more and 8 or less carbon atoms as the monomer (b-2), more preferably contains at least one kind selected from the group consisting of a homopolymer consisting of a constitutional unit derived from (meth)acrylic acid as the monomer (b-1), a vinyl-based polymer containing a constitutional unit derived from at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms as the monomer (b-2), and a constitutional unit derived from at least one kind selected from the group consisting of styrene and a styrene derivative as the monomer (b-3), and a vinyl-based polymer containing a constitutional unit derived from the group consisting of at least one kind selected from the group consisting of (meth)acrylic acid and maleic acid as the monomer (b-1), a constitutional unit derived from at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms as the monomer (b-2), and a constitutional unit derived from at least one kind selected from the group consisting of styrene and a styrene derivative as the monomer (b-3), further preferably contains at least one kind selected from the group consisting of a vinyl-based polymer containing a constitutional unit derived from at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms as the monomer (b-2), and a constitutional unit derived from at least one kind selected from the group consisting of styrene and a styrene derivative as the monomer (b-3), and a vinyl-based polymer containing a constitutional unit derived from at least one kind selected from the group consisting of (meth)acrylic acid and maleic acid as the monomer (b-1), a constitutional unit derived from at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms as the monomer (b-2), and a constitutional unit derived from at least one kind selected from the group consisting of styrene and a styrene derivative as the monomer (b-3), and still further preferably contains a vinyl-based polymer containing a constitutional unit derived from at least one kind selected from the group consisting of (meth)acrylic acid and maleic acid as the monomer (b-1), a constitutional unit derived from at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms as the monomer (b-2), and constitutional unit derived from at least one kind selected from the group consisting of styrene and a styrene derivative as the monomer (b-3) (all of which are generically referred to as a vinyl-based polymer (b-II) component), from the standpoints as above.

The content of the preferred vinyl-based polymer (b-II) component in the polymer b is preferably 80% by mass or more, more preferably 90% by mass or more, further preferably 95% by mass or more, still further preferably 98% by mass or more, and still more further preferably substantially 100% by mass, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The expression "substantially 100% by mass" herein means that a component that is unintentionally contained may be contained. The component that is unintentionally contained means, for example, that a polymer b component other than the vinyl-based polymer contained in the vinyl-based polymer may be contained.

In the case where the polymer b is a copolymer containing at least one kind of a constitutional unit selected from the group consisting of a constitutional unit derived from the monomer (b-1) and a constitutional unit derived from the monomer (b-2), the preferred content (% by mol) of the monomers (b-1) and (b-2) in the raw material monomers in the production of the polymer b or the preferred content (% by mol) of the constitutional units derived from the monomers (b-1) and (b-2) in the polymer b is as follows from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of the monomer (b-1) is preferably 2% by mol or more, more preferably 5% by mol or more, and further preferably 7% by mol or more, and is preferably 30% by mol or less, more preferably 25% by mol or less, and further preferably 23% by mol or less.

The content of the monomer (b-2) is preferably 2% by mol or more, more preferably 5% by mol or more, and further preferably 7% by mol or more, and is preferably 25% by mol or less, more preferably 20% by mol or less, and further preferably 15% by mol or less.

In the case where the polymer b is a copolymer containing a constitutional unit derived from the monomer (b-2) and a constitutional unit derived from the monomer (b-3) that does not contain a constitutional unit derived from the monomer (b-1), the preferred content (% by mol) of the monomers (b-2) and (b-3) in the raw material monomers in the production of the polymer b or the preferred content (% by mol) of the constitutional units derived from the monomers (b-2) and (b-3) in the polymer b is as follows from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of the monomer (b-2) is preferably 5% by mol or more, more preferably 8% by mol or more, and further preferably 10% by mol or more, and is preferably 30% by mol or less, more preferably 25% by mol or less, and further preferably 20% by mol or less.

The content of the monomer (b-3) is preferably 70% by mol or more, more preferably 75% by mol or more, and further preferably 80% by mol or more, and is preferably 95% by mol or less, more preferably 92% by mol or less, and further preferably 90% by mol or less.

In the case where the polymer b is a copolymer containing constitutional units derived from the monomers (b-1) to (b-3), the preferred content (% by mol) of the monomers (b-1) to (b-3) in the raw material monomers in the production of the polymer b or the preferred content (% by mol) of the constitutional units derived from the monomers (b-1) to (b-3) in the polymer b is as follows from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of the monomer (b-1) is preferably 2% by mol or more, more preferably 5% by mol or more, and further preferably 7% by mol or more, and is preferably 30% by mol or less, more preferably 25% by mol or less, and further preferably 23% by mol or less.

The content of the monomer (b-2) is preferably 2% by mol or more, more preferably 5% by mol or more, and further preferably 7% by mol or more, and is preferably 25% by mol or less, more preferably 20% by mol or less, and further preferably 15% by mol or less.

The content of the monomer (b-3) is preferably 50% by mol or more, more preferably 60% by mol or more, and further preferably 65% by mol or more, and is preferably 95% by mol or less, more preferably 92% by mol or less, and further preferably 90% by mol or less.

In the case where the polymer b is a copolymer containing at least one kind of a constitutional unit selected from the group consisting of a constitutional unit derived from the monomer (b-1) and a constitutional unit derived from the monomer (b-2), the preferred content (% by mass) of the monomers (b-1) and (b-2) in the raw material monomers in the production of the polymer b or the preferred content (% by mass) of the constitutional units derived from the monomers (b-1) and (b-2) in the polymer b is as follows from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of the monomer (b-1) is preferably 1% by mass or more, more preferably 2% by mass or more, and further preferably 3% by mass or more, and is preferably 30% by mass or less, more preferably 20% by mass or less, and further preferably 10% by mass or less.

The content of the monomer (b-2) is preferably 5% by mass or more, more preferably 10% by mass or more, further preferably 15% by mass or more, and still further preferably 20% by mass or more, and is preferably 80% by mass or less, more preferably 75% by mass or less, and further preferably 70% by mass or less.

In the case where the polymer b is a copolymer containing a constitutional unit derived from the monomer (b-2) and a constitutional unit derived from the monomer (b-3) that does not contain a constitutional unit derived from the monomer (b-1), the preferred content (% by mass) of the monomers (b-2) and (b-3) in the raw material monomers in the production of the polymer b or the preferred content (% by mass) of the constitutional units derived from the monomers (b-2) and (b-3) in the polymer b is as follows from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of the monomer (b-2) is preferably 10% by mass or more, more preferably 20% by mass or more, and further preferably 30% by mass or more, and is preferably 70% by mass or less, more preferably 60% by mass or less, and further preferably 50% by mass or less.

The content of the monomer (b-3) is preferably 30% by mass or more, more preferably 40% by mass or more, and further preferably 50% by mass or more, and is preferably 90% by mass or less, more preferably 80% by mass or less, and further preferably 70% by mass or less.

In the case where the polymer b is a vinyl-based polymer containing a constitutional unit derived from the monomer (b-1) having a carboxy group and a constitutional unit derived from the monomer (b-2) having a polyoxyalkylene group, the preferred contents (% by mass) (which each are a content in terms of the non-neutralized amount, hereinafter the same) of the respective monomers in the raw material monomers in the production of the polymer b or the preferred contents (% by mass) of the constitutional units derived from the respective monomers in the polymer b are as follows from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of the monomer (b-1) is preferably 1% by mass or more, more preferably 2% by mass or more, and further preferably 3% by mass or more, and is preferably 30% by mass or less, more preferably 20% by mass or less, and further preferably 10% by mass or less.

The content of the monomer (b-2) is preferably 5% by mass or more, more preferably 10% by mass or more, further preferably 15% by mass or more, and still further preferably 20% by mass or more, and is preferably 80% by mass or less, more preferably 75% by mass or less, and further preferably 70% by mass or less.

The mass ratio ((monomer (b-2))/(monomer (b-1))) of the constitutional unit derived from the monomer (b-2) with respect to the constitutional unit derived from the monomer (b-1) in the polymer b is preferably 0.5 or more, more preferably 1 or more, further preferably 3 or more, and still further preferably 5 or more, and is preferably 16 or less, more preferably 14 or less, and further preferably 12 or less.

The total content of the constitutional unit derived from the monomer (b-1) and the constitutional unit derived from the monomer (b-2) in the polymer b is preferably 10% by mass or more, more preferably 20% by mass or more, and further preferably 30% by mass or more, and is preferably 90% by mass or less, more preferably 85% by mass or less, and further preferably 80% by mass or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the case where the polymer b is a vinyl-based polymer containing a constitutional unit derived from the monomer (b-3) in addition to the constitutional unit derived from the monomer (b-1) and the constitutional unit derived from the monomer (b-2), the content of the monomer (b-3) is preferably 10% by mass or more, more preferably 15% by mass or more, and further preferably 20% by mass or more, and is preferably 80% by mass or less, more preferably 75% by mass or less, and further preferably 70% by mass or less.

The polymer b used may be a polymer that is synthesized according to the known method, and may be a commercially available product. Examples of the commercially available product of the polymer b include DISPERBYK-190 and DISPERBYK-2015, all available from BYK GmbH.

The number average molecular weight Mn of the polymer b is preferably 1,000 or more, more preferably 2,000 or more, and further preferably 3,000 or more, and is preferably 100,000 or less, more preferably 50,000 or less, further preferably 30,000 or less, still further preferably 20,000 or less, and still more further preferably 15,000 or less. In the case where the number average molecular weight of the polymer b is in the range, the sufficient adsorption force to the metallic fine particles can be obtained, and the dispersion stability can be exhibited. The number average molecular weight Mn can be measured according to the method described in the examples.

In the case where the polymer b is a copolymer containing at least a constitutional unit derived from the monomer (b-1), the acid value of the polymer b is preferably 5 mgKOH/g or more, more preferably 10 mgKOH/g or more, and further preferably 15 mgKOH/g or more, and is preferably 200 mgKOH/g or less, more preferably 100 mgKOH/g or less, further preferably 70 mgKOH/g or less, and still further preferably 50 mgKOH/g or less, from the standpoint of the enhancement of the storage stability and the jetting stability of the ink, the standpoint of the reduction of the volume resistivity, and the standpoint of the reduction of the fluctuation in volume resistivity caused by temperature change.

The acid value of the polymer b can be calculated from the mass ratio of the monomers constituting the polymer, and may also be obtained by titrating the polymer dissolved or swollen in a suitable solvent.

In the case where the dispersant B is the polymer b, the configuration of the polymer b in the metallic fine particle-containing ink includes the configuration in which the polymer b is adsorbed onto the respective metallic fine particles A, the metallic fine particle-enclosing (-encapsulating) configuration in which the polymer b contains the metallic fine particles A, and the configuration in which the polymer b is not adsorbed onto the metallic fine particles A. The configuration in which the polymer b contains the metallic fine particles A is preferred, and the metallic fine particle-enclosing (-encapsulating) configuration in which the polymer b contains the metallic fine particles A is more preferred, from the standpoint of the dispersion stability of the metallic fine particles.

The content of the polymer b in the ink of the present invention is preferably 1% by mass or more, more preferably 2% by mass or more, and further preferably 3% by mass or more, from the standpoint of the enhancement of the storage stability and the jetting stability of the ink, and is preferably 10% by mass or less, more preferably 7% by mass or less, and further preferably 5% by mass or less, from the standpoint of the reduction of the volume resistivity of the metal film and the standpoint of the reduction of the fluctuation in volume resistivity caused by temperature change.

The mass ratio ((polymer b)/((metallic fine particles A)+ (polymer b))) of the content of the polymer b with respect to the total content of the metallic fine particles A and the polymer b in the ink of the present invention is preferably 0.01 or more, more preferably 0.05 or more, further preferably 0.08 or more, still further preferably 0.09 or more, and still more further preferably 0.10 or more, and is preferably 0.3 or less, more preferably 0.2 or less, and further preferably 0.15 or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The mass ratio ((polymer b)/((metallic fine particles A)+ (polymer b))) is calculated from the masses of the metallic fine particles A and the polymer b measured according to the method described in the examples using a simultaneous thermogravimetry/differential thermal analyzer (TG/DTA).

A solvent contained in the ink of the present invention (which may be hereinafter referred to as an "ink solvent") is not particularly limited, and may be appropriately selected depending on the application of the ink. In particular, the ink of the present invention preferably further contains at least one kind selected from the group consisting of an organic solvent C and water, and more preferably further contains an organic solvent C and water, as the ink solvent, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

<Organic Solvent C>

The ink of the present invention preferably further contains an organic solvent C from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The organic solvent C preferably contains one or more kind of an organic solvent having a boiling point of 70° C. or more.

One kind of the organic solvent C may be used alone, or two or more kinds thereof may be used in combination.

The boiling point of the organic solvent C is preferably 70° C. or more, more preferably 90° C. or more, further preferably 110° C. or more, still further preferably 130° C. or more, and still more further preferably 150° C. or more, and is preferably 300° C. or less, more preferably 250° C. or less, further preferably 230° C. or less, and still further preferably 200° C. or less. In the case where two or more kinds of the organic solvent C are used, the boiling point of the organic solvent C is calculated as a weighted average value.

Examples of the organic solvent C include a polyhydric alcohol, a polyhydric alcohol alkyl ether, a nitrogen-containing heterocyclic compound, an amine, an amide, and a sulfur-containing compound, and among these, a polyhydric alcohol is preferred.

The polyhydric alcohol is not particularly limited, as far as the compound has two or more alcoholic hydroxy groups in one molecule. Examples of the polyhydric alcohol include a 1,2-alkanediol, such as ethylene glycol (boiling point: 197° C.), propylene glycol (1,2-propanediol) (boiling point: 188° C.), 1,2-butanediol (boiling point: 193° C.), 1,2-pentanediol (boiling point: 206° C.), and 1,2-hexanediol (boiling point: 223° C.); a polyalkylene glycol, such as diethylene glycol (boiling point: 245° C.), triethylene glycol (boiling point: 287° C.), tetraethylene glycol (boiling point: 314° C.), polyethylene glycol, dipropylene glycol (boiling point: 232° C.), and tripropylene glycol (boiling point: 271° C.); an am-alkanediol, such as 1,3-propanediol (boiling point: 210° C.), 1,4-butanediol (boiling point: 230° C.), and 1,5-pentanediol (boiling point: 242° C.); a diol, such as 1,3-butanediol (boiling point: 208° C.), 3-methyl-1,3-butanediol (boiling point: 203° C.), and 2-methyl-2,4-pentanediol (boiling point: 196° C.); and a triol, such as glycerin.

The organic solvent C preferably contains at least one kind selected from the group consisting of a diol and a triol, more preferably contains at least one kind selected from the group consisting of a 1,2-alkanediol, a polyalkylene glycol, an α,ω-alkanediol, and glycerin, further preferably contains at least one kind selected from the group consisting of a 1,2-alkanediol, an am-alkanediol, and glycerin, still further preferably is at least one kind selected from the group consisting of ethylene glycol, propylene glycol, 1,4-butanediol, and glycerin, still more further preferably is at least one kind selected from the group consisting of ethylene glycol and propylene glycol, even further preferably contains propylene glycol, and even still further preferably is propylene glycol, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the case where the organic solvent C contains at least one kind selected from the group consisting of a 1,2-alkanediol, a polyalkylene glycol, an α,ω-alkanediol, and glycerin, the total content of a 1,2-alkanediol, a polyalkylene glycol, an α,ω-alkanediol, and glycerin in the organic solvent C is preferably 80% by mass or more, more preferably 90% by mass or more, further preferably 95% by mass or more, and still further preferably 98% by mass or more, and still more further preferably substantially 100% by mass, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The expression "substantially 100% by mass" herein means that a component that is unintentionally contained may be contained. Examples of the component that is unintentionally contained include the organic solvent C component other than a 1,2-alkanediol, a polyalkylene glycol, an am-alkanediol, and glycerin contained in the polyol as the raw material.

In the case where the organic solvent C contains propylene glycol, the content of the propylene glycol in the organic solvent C is preferably 80% by mass or more, more preferably 90% by mass or more, further preferably 95% by mass or more, and still further preferably 98% by mass or more, and still more further preferably substantially 100% by mass, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The expression "substantially 100% by mass" herein means that a component that is unintentionally contained may be contained. Examples of the component that is unintentionally contained include the organic solvent C component other than propylene glycol contained in the propylene glycol as the raw material.

The content of the organic solvent C in the ink of the present invention is preferably 3% by mass or more, more preferably 5% by mass or more, further preferably 10% by mass or more, still further preferably 20% by mass or more, and still more further preferably 30% by mass or more, and is preferably 60% by mass or less, more preferably 50% by mass or less, and further preferably 40% by mass or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the case where the ink of the present invention contains propylene glycol as the organic solvent C, the content of propylene glycol in the ink of the present invention is preferably 3% by mass or more, more preferably 5% by mass or more, further preferably 10% by mass or more, still further preferably 20% by mass or more, and still more further preferably 30% by mass or more, and is preferably 60% by mass or less, more preferably 50% by mass or less, and further preferably 40% by mass or less, from the same standpoints as above.

<Water>

The ink of the present invention preferably further contains water from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The content of water in the ink of the present invention is preferably 5% by mass or more, more preferably 10% by mass or more, and further preferably 20% by mass or more, and is preferably 65% by mass or less, more preferably 50% by mass or less, and further preferably 40% by mass or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the case where the ink of the present invention contains the organic solvent C and water, the total content of the organic solvent C and water in the ink of the present invention is preferably 10% by mass or more, more preferably 30% by mass or more, further preferably 50% by mass or more, and still further preferably 55% by mass or more, and is preferably 85% by mass or less, more preferably 80% by mass or less, and further preferably 75% by mass or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the case where the ink of the present invention contains the organic solvent C and water, the mass ratio ((organic solvent C)/((organic solvent C)+(water))) of the content of the organic solvent C with respect to the total content of the organic solvent C and water in the ink of the present invention is preferably 0.05 or more, more preferably 0.2 or more, further preferably 0.4 or more, and still further preferably 0.5 or more, and is preferably 0.9 or less, more preferably 0.7 or less, and further preferably 0.6 or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

In the case where the ink of the present invention contains the organic solvent C and water, and the organic solvent C contains propylene glycol, the mass ratio ((propylene glycol)/((propylene glycol)+(water))) of the content of the propylene glycol with respect to the total content of propylene glycol and water in the ink of the present invention is preferably 0.05 or more, more preferably 0.2 or more, further preferably 0.4 or more, and still further preferably 0.5 or more, and is preferably 0.9 or less, more preferably 0.7 or less, and further preferably 0.6 or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The ink of the present invention may further contain various additives, such as a fixing aid, e.g., a dispersion of polymer particles, a humectant, a wetting agent, a penetrant, a surfactant, a viscosity modifier, an defoaming agent, an antiseptic agent, a mildew-proof agent, and a rust preventive, as an additional component other than the aforementioned components, in such a range that does not impair the effects of the present invention.

[Method of Producing Metallic Fine Particle-Containing Ink]

The ink of the present invention can be obtained by (i) a method of mixing a metal raw material compound, a reducing agent, and depending on necessity the dispersant B, so as to reduce the metal raw material compound, (ii) a method of adding and mixing depending on necessity the dispersant B, the organic solvent C, water, and the like with the metallic fine particles A having been prepared in advance by the known method, and the like. Among these, (i) a method of mixing a metal raw material compound, a reducing agent, and depending on necessity the dispersant B, so as to reduce the metal raw material compound is preferred from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. Preferred examples of the method (i) include a method of regulating the reduction reaction of the metal raw material compound in such a manner that the volume average particle diameter $D_A$ and the ratio ($D_A/L_A$) of the volume average particle diameter $D_A$ with respect to the crystallite size $L_A$ (nm) of the metallic fine particles A contained in the resulting ink are in the numerical ranges described above.

Specifically, the method of producing an ink of the present invention preferably includes step 1: a step of reducing a metal raw material compound, the metal constituting the metal raw material compound containing silver, the temperature of the reduction reaction in the step 1 being regulated in such a manner that the metallic fine particles contained in the resultant ink has a volume average particle diameter $D_A$ of 20 nm or more and 50 nm or less, and the metallic fine particles contained in the resultant ink has a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

The method (i) is preferably a method in which metallic fine particle dried powder obtained by reducing the metal raw material compound is provided in advance, and then the metallic fine particle dried powder and at least one kind selected from the group consisting of the organic solvent C and water as the ink solvent are mixed, and more preferably a method in which metallic fine particle dried powder containing the dispersant B is provided in advance, and then the organic solvent C and water as the ink solvent are added and mixed therewith.

In the production of the metallic fine particle dried powder, the reduction reaction of the metal raw material compound is preferably regulated in such a manner that the volume average particle diameter $D_A$ and the ratio ($D_A/L_A$) of the volume average particle diameter $D_A$ with respect to the crystallite size $L_A$ (nm) of the metallic fine particles A contained in the resulting ink are in the numerical ranges described above. After providing the reduced product through reduction of the metal raw material compound, the reduced product may be dried through freeze-drying or the like, so as to provide the metallic fine particle dried powder. In the case where the dispersant B is used, the metallic fine particle dried powder may be obtained in such a manner that the metal raw material compound, the reducing agent, and the dispersant B are mixed to reduce the metal raw material compound with the reducing agent, resulting in a dispersion of the metallic fine particles dispersed with the dispersant B, as a reduced product, and then the reduced product (i.e., the dispersion of the metallic fine particles) is dried through freeze-drying or the like.

In the case where freeze-drying is performed in the method of producing an ink of the present invention, the method preferably includes a step of storing the resulting freeze-dried product from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. Specifically, the ink of the present invention is preferably obtained by a production method including the following steps 1 to 3 from the same standpoints as above:

step 1: a step of reducing a metal raw material compound, step 2: a step of freeze-drying a reduced product obtained in the step 1, and step 3: a step of storing a freeze-dried product obtained in the step 2.

It is more preferred that the temperature of the reduction reaction in the step 1, and the storing temperature and the storing time of the freeze-dried product in the step 3 are regulated in such a manner that the metallic fine particles contained in the resultant ink has a volume average particle diameter $D_A$ of 20 nm or more and 50 nm or less, and the metallic fine particles contained in the resultant ink has a ratio $(D_A/L_A)$ of the volume average particle diameter $D_A$ with respect to a crystallite size $L_A$ (nm) obtained from the (111) plane in powder X-ray diffractometry of the metallic fine particles of 1.6 or more and 3.1 or less.

(Step 1)

The step 1 is preferably a step of mixing a metal raw material compound, a reducing agent, and depending on necessity the dispersant B, so as to reduce the metal raw material compound with the reducing agent, more preferably a step of mixing a metal raw material compound, a reducing agent, and the dispersant B, so as to reduce the metal raw material compound with the reducing agent, resulting in a dispersion of the metallic fine particles dispersed with the dispersant B, as a reduced product, and further preferably a step of mixing a metal raw material compound, a reducing agent, and the polymer b, so as to reduce the metal raw material compound with the reducing agent, resulting in a dispersion of the metallic fine particles dispersed with the polymer b, as a reduced product.

The metal (metal atom) constituting the metal raw material compound contains silver.

The content of silver in the metal (metal atom) constituting the metal raw material compound is preferably 80% by mass or more, more preferably 90% by mass or more, further preferably 95% by mass or more, still further preferably 98% by mass or more, and still more further preferably substantially 100% by mass, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The expression "substantially 100% by mass" herein means that a component that is unintentionally contained may be contained. Examples of the component that is unintentionally contained include an unavoidable impurity.

The metal (metal atom) constituting the metal raw material compound may contain a metal other than silver in such a range that does not impair the effects of the present invention. Examples of the metal other than silver include the metals other than silver exemplified for the metallic fine particles A above.

Examples of the metal raw material compound include a metal salt of an inorganic acid or an organic acid, a metal oxide, a metal hydroxide, a metal sulfide, and a metal halide, containing silver. Examples of the metal salt include a metal salt of an inorganic acid, such as a nitrate, a nitrite, a sulfate, a carbonate, an ammonium salt, and a perchlorate; and a metal salt of an organic acid, such as an acetate. One kind of the metal raw material compound may be used alone, or two or more kinds thereof may be used as a mixture. Among these, the metal raw material compound is preferably a metal salt containing silver of an inorganic acid or an organic acid, more preferably a metal salt containing silver of an inorganic acid, further preferably a metal salt containing silver of a nitric acid, and still further preferably silver nitrate.

The reducing agent is not particularly limited, and any of an inorganic reducing agent and an organic reducing agent may be used, and an organic reducing agent is preferred.

Examples of the organic reducing agent include an alcohol compound, such as ethylene glycol and propylene glycol; an aldehyde compound, such as formaldehyde, acetaldehyde, and propionaldehyde; an acid compound and a salt thereof, such as ascorbic acid and citric acid; an alkanolamine, such as ethanolamine, N-methylethanolamine, N,N-dimethylethanolamine (2-(dimethylamino) ethanol), N,N-diethylethanolamine, diethanolamine, N-methyldiethanolamine, triethanolamine, propanolamine, N,N-dimethylprop anolamine, butanolamine, and hexanolamine; an alkylamine, such as propylamine, butylamine, hexylamine, diethylamine, dipropylamine, dimethylethylamine, diethylmethylamine, and triethylamine; an aliphatic amine, such as a (poly)alkylenepolyamine, e.g., ethylenediamine, triethylenediamine, tetramethylethylenediamine, diethylenetriamine, dipropylenetriamine, triethylenetetramine, and tetraethylenepentamine; an alicyclic amine, such as piperidine, pyrrolidine, N-methylpyrrolidine, and morpholine; an aromatic amine, such as aniline, N-methylaniline, toluidine, anisidine, and phenetidine; and an aralkylamine, such as benzylamine and N-methylbenzylamine.

One kind of the reducing agent may be used alone, or two or more kinds thereof may be used in combination.

The temperature of the reduction reaction is preferably 5° C. or more, more preferably 10° C. or more, further preferably 20° C. or more, and still further preferably 30° C. or more, and is preferably 90° C. or less, more preferably 80° C. or less, and further preferably 50° C. or less, from the standpoint of the reduction of the particle diameter of the metallic fine particles, and the uniformization of the particle diameter, the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change. The reduction reaction may be performed in an air atmosphere, or may be performed in an inert gas atmosphere, such as nitrogen gas.

In the method of producing an ink of the present invention, the reduced product (which is preferably the dispersion of metallic fine particles) obtained before freeze-drying may be purified from the standpoint of the removal of the impurities, such as the unreacted reducing agent and the excess dispersant B that does not contribute to the dispersion of the metallic fine particles A.

The method of purifying the reduced product (which is preferably the dispersion of metallic fine particles) is not particularly limited, and examples thereof include a membrane treatment, such as dialysis and ultrafiltration; and a centrifugal treatment. Among these, a membrane treatment is preferred, and dialysis is more preferred, from the standpoint of the efficient removal of the impurities. The material of the dialysis membrane used for the dialysis is preferably regenerated cellulose.

The molecular weight cut-off of the dialysis membrane is preferably 1,000 or more, more preferably 5,000 or more, and further preferably 10,000 or more, and is preferably 100,000 or less, and more preferably 70,000 or less, from the standpoint of the efficient removal of the impurities.

The ink of the present invention can be obtained by further adding the various additives described above depending on necessity, and then subjecting to a filtration treatment with a filter or the like.

(Step 2)

The freeze-drying of the reduced product obtained in the step 1 may be performed by the ordinary method. Examples of the freeze-drying include a method of preliminarily freezing the reduced product, and then drying.

The preliminary freezing is preferably performed by rapidly freezing at a temperature of −40° C. or more and −20° C. or less under ordinary pressure. After the preliminary freezing, it is preferred that primary drying for subliming ice in the preliminarily frozen product is performed in vacuum of 0.1 Pa or more and 100 Pa or less at a temperature of −20° C. or more and −5° C. or less, and then secondary drying is performed in vacuum of 0.1 Pa or more and 100 Pa or less at a temperature of 20° C. or more and 40° C. or less.

(Step 3)

The storing temperature of the freeze-dried product obtained in the step 2 is preferably 0° C. or more, more preferably 10° C. or more, and further preferably 15° C. or more, and is preferably 70° C. or less, more preferably 60° C. or less, further preferably 45° C. or less, and still further preferably 35° C. or less, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The storing time of the freeze-dried product obtained in the step 2 is preferably 1 hour or more, more preferably 4 hours or more, and further preferably 6 hours or more, from the same standpoints as above, and is preferably 48 hours or less, and more preferably 24 hours or less, from the same standpoints as above and the standpoint of the productivity.

(Step 4)

The method of producing an ink of the present invention preferably includes the following step 4 after the step 3:

step 4: a step of mixing metallic fine particle dried powder obtained in the step 3 and an ink solvent to provide the metallic fine particle-containing ink.

The ink solvent used in the step 4 is preferably at least one kind selected from the group consisting of the organic solvent (C) and water, and more preferably the organic solvent (C) and water, from the standpoint of the enhancement of the dispersion stability of the metallic fine particles, resulting in the enhancement of the storage stability and the jetting stability of the ink, the standpoint of the reduction of the volume resistivity, and the standpoint of the reduction of the fluctuation in volume resistivity caused by temperature change.

The mixing of the metallic fine particle dried powder and the ink solvent in the step 4 may be performed according to the ordinary method. In the step 4, depending on necessity, the various additives described above may be added, and a filtration treatment may be performed with a filter or the like.

The viscosity at 25° C. of the ink of the present invention is preferably 2 mPa s or more, more preferably 3 mPa s or more, further preferably 4 mPa s or more, still further preferably 5 mPa s or more, and still more further preferably 6 mPa s or more, and is preferably 12 mPa·s or less, more preferably 11 mPa·s or less, and further preferably 10 mPa·s or less, from the standpoint of the storage stability and the jetting stability. The viscosity of the ink can be measured according to the method described in the examples with an E-type viscometer.

The pH at 20° C. of the ink of the present invention is preferably 7.0 or more, more preferably 7.2 or more, and further preferably 7.5 or more, from the standpoint of the storage stability and the jetting stability. The pH thereof is preferably 11 or less, more preferably 10 or less, and further preferably 9.5 or less, from the standpoint of the resistance of components and the skin irritation. The pH of the ink can be measured according to the ordinary method.

The ink of the present invention is excellent in storage stability under an environment at ordinary temperature or more, and can form a metal film having a low volume resistivity and a small fluctuation in volume resistivity caused by temperature change, and therefore the ink can be favorably applied particularly to various printing methods, such as ink-jet printing, flexographic printing, gravure printing, screen printing, offset printing, and dispenser printing. Among these, the ink of the present invention is preferably applied to ink-jet printing since the ink is excellent in jetting stability as described above.

The ink of the present invention is excellent in storage stability under an environment at ordinary temperature or more, and can form a metal film having a low volume resistivity and a small fluctuation in volume resistivity caused by temperature change, and therefore the ink can be applied to a wide variety of fields. Examples of the fields include a conductive material, such as a wiring material, an electrode material, a multilayer ceramic capacitor (which may be hereinafter referred to as "MLCC"), and low temperature co-fired ceramics (which may be hereinafter referred to as "LTCC"); a bonding material, such as solder; various sensors; an antenna, such as a tag for an automatic recognition system using near field communication (radio frequency identifier (which may be hereinafter referred to as "RFID")); a catalyst; an optical material; and a medical material.

[Method of Producing Printed Matter]

The method of producing a printed matter of the present invention includes printing the ink on a substrate, so as to provide a printed matter including the substrate having a metal film formed thereon.

(Substrate)

Examples of the substrate according to the present invention include paper, a resin, a cloth, a metal, glass, ceramics, or a composite material thereof.

Examples of the paper substrate include coated paper (such as coated paper and art paper), uncoated paper, plain paper, craft paper, synthetic paper, processed paper, and paper board.

Examples of the substrate formed of a resin include various resin films, such as polyethylene terephthalate (PET), polyethylene naphthalate (PEN), polybutylene terephthalate (PBT), polypropylene (PP), polyamide (PA), polyimide (PI), polyvinyl chloride (PVC), polymethyl methacrylate (PMMA), polystyrene (PS), an acrylonitrile-butadiene-styrene copolymer (ABS), an acrylonitrile-styrene copolymer (AS), and polycarbonate (PC).

The production method of the present invention is excellent in low temperature sinterability of the metallic fine particles as described later, and therefore a metal film having a low volume resistivity can be formed even on the substrate formed of a resin that has relatively low heat resistance.

From this standpoint, the heat resisting temperature of the substrate formed of a resin is preferably 200° C. or less, more preferably 170° C. or less, further preferably 150° C. or less, and still further preferably 130° C. or less, and is preferably 60° C. or more, more preferably 80° C. or more, and further preferably 100° C. or more.

Examples of the cloth used as the substrate include a cloth formed of natural fibers, such as cotton, silk, and linen, or synthetic fibers, such as rayon fibers, acetate fibers, nylon fibers, and polyester fibers, or a mixed cloth formed of two or more kinds of these fibers.

Examples of the substrate formed of a metal include a base board using a metal, such as gold, silver, copper, palladium, platinum, aluminum, nickel, and tin.

Among these, at least one kind selected from the group consisting of a paper substrate and a substrate formed of a resin is preferred, and a substrate formed of a resin is more preferred, from the standpoint of the reduction of the volume resistivity, and the standpoint of the reduction of the fluctuation in volume resistivity caused by temperature change.

Preferred examples of the printing method of the ink of the present invention on the substrate include various pattern printing methods, such as ink-jet printing, flexographic printing, gravure printing, screen printing, offset printing, and dispenser printing The amount of the ink of the present invention applied to the substrate may be appropriately regulated corresponding to the size and the kind of the circuit or the electrode to be formed.

(Ink-Jet Printing)

In the case where the ink according to the present invention is applied to ink-jet printing, the ink may be installed in a known ink-jet printer, and jetted as ink droplets onto the substrate to form a printed image and the like.

The ink-jet printer includes a thermal type and a piezo type, and the ink is more preferably applied to thermal type ink-jet printing.

The head temperature of the ink-jet head is preferably 15° C. or more, more preferably 20° C. or more, and further preferably 25° C. or more, and is preferably or less, more preferably 40° C. or less, and further preferably 35° C. or less.

The head voltage of the ink-jet head is preferably 5 V or more, more preferably 10 V or more, and further preferably 15 V or more, and is preferably 40 V or less, more preferably 35 V or less, and further preferably 30 V or less, from the standpoint of the efficiency in printing, and the like.

The driving frequency of the head is preferably 1 kHz or more, more preferably 5 kHz or more, and further preferably 10 kHz or more, and is preferably kHz or less, more preferably 40 kHz or less, and further preferably 35 kHz or less, from the standpoint of the efficiency in printing, and the like.

The jetted droplet amount of the ink according to the present invention is preferably 5 µL or more, and more preferably 10 µL or more, and is preferably 30 µL or less, and more preferably 20 µL or less, all per one droplet.

The applied amount of the ink according to the present invention in terms of solid content onto the substrate is preferably 0.5 g/m$^2$ or more, more preferably 1 g/m$^2$ or more, and further preferably 2 g/m$^2$ or more, and is preferably 20 g/m$^2$ or less, more preferably 15 g/m$^2$ or less, and further preferably 10 g/m$^2$ or less.

The resolution in printing is preferably 200 dpi or more, and more preferably 300 dpi or more, and is preferably 1,000 dpi or less, more preferably 800 dpi or less, and further preferably 600 dpi or less. The "resolution" in the description herein means the number of dots per one inch (2.54 cm) formed on the substrate. For example, a "resolution of 600 dpi" means that when the ink droplets are jetted on a substrate using a line head on which nozzles are arranged such that the number of nozzle ports per a length of a nozzle row is 600 dpi (dots/inch), a corresponding dot row of 600 dpi is formed in the direction perpendicular to a transporting direction of the substrate, and further when jetting the ink droplets while moving the substrate in the transporting direction thereof, the dot row of 600 dpi is also formed on the substrate along the transporting direction thereof. In the description herein, the resolution in the direction perpendicular to the transporting direction of the substrate and the resolution in the transporting direction thereof are shown as the same value.

(Sintering Treatment)

The method of producing a printed matter of the present invention preferably includes, after printing the ink on the substrate, performing a sintering treatment of sintering the metallic fine particles A in the film of the ink formed on the substrate, from the standpoint of the reduction of the volume resistivity, and the standpoint of the reduction of the fluctuation in volume resistivity caused by temperature change. The sintering treatment evaporates and dries the medium (i.e., the ink solvent) in the ink film, and sinters the metallic fine particles A, and thereby a metal film having a low volume resistivity can be formed.

The sintering treatment is preferably performed by storing the substrate having the film of the ink formed thereon through printing, under a prescribed temperature, from the standpoint of the reduction of the volume resistivity, and the standpoint of the reduction of the fluctuation in volume resistivity caused by temperature change.

The storing temperature in the sintering treatment is preferably less than the temperature at which the substrate is deformed, and specifically, the temperature is preferably 50° C. or more, more preferably 90° C. or more, and further preferably 95° C. or more, and is preferably 300° C. or less, more preferably 200° C. or less, further preferably 170° C. or less, still further preferably 130° C. or less, and still more further preferably 110° C. or less, under ordinary pressure, from the standpoint of the reduction of the volume resistivity, and the standpoint of the reduction of the fluctuation in volume resistivity caused by temperature change. The storing time in the sintering treatment in this case is preferably 1 minute or more, more preferably 30 minutes or more, further preferably 1 hour or more, still further preferably 2 hours or more, and still more further preferably 3 hours or more, and is preferably 12 hours or less, more preferably 8 hours or less, and further preferably 6 hours or less, from the same standpoints as above.

The relative humidity of the storing environment in the sintering treatment is preferably 20% or more, more preferably 30% or more, and further preferably 40% or more, and is preferably 65% or less, and more preferably 60% or less.

The method of subjecting the substrate having the film of the ink formed thereon in the sintering treatment to the prescribed temperature is not particularly limited, and examples thereof include a method of storing the substrate having the ink film formed thereon in a thermostat chamber capable of retaining the temperature constant, a method of heating by applying hot air to the ink-coated surface on the substrate, a method of heating by bringing a heater close to the ink-coated surface on the substrate, a method of heating by bringing a heater into contact with the surface of the substrate opposite to the surface having the ink film formed thereon, a method of heating by steam aging with high temperature steam under ordinary pressure or high pressure, and a method of heating through irradiation of light, such as near infrared light or ultraviolet light.

The crystallite size $L_C$ obtained from the (111) plane in X-ray diffractometry of the metal film formed by the printing method of the present invention is preferably 10 nm or more, more preferably 20 nm or more, and further preferably 30 nm or more, and is preferably 250 nm or less, more preferably 220 nm or less, further preferably 150 nm or less, still further preferably 100 nm or less, still more further preferably 70 nm or less, and even further preferably 50 nm or less, from the standpoint of the reduction of the volume resistivity, and the standpoint of the reduction of the fluctuation in volume resistivity caused by temperature change.

The ratio ($L_C/L_A$) of the crystallite size $L_C$ (nm) obtained from the (111) plane in X-ray diffractometry of the metal film formed by the printing method of the present invention with respect to the crystallite size $L_A$ (nm) of the metallic fine particles A is preferably 1 or more, more preferably 1.5 or more, and further preferably 2 or more, and is preferably 20 or less, more preferably 17 or less, further preferably 13 or less, still further preferably 10 or less, still more further preferably 7 or less, even further preferably 5 or less, and even still further preferably 3 or less, from the standpoint of the reduction of the volume resistivity, and the standpoint of the reduction of the fluctuation in volume resistivity caused by temperature change.

The crystallite size $L_C$ can be regulated by the composition and the production condition of the metallic fine particle-containing ink (for example, the storing state of the metallic fine particle dried powder (which is preferably the freeze-dried product) in the case where the ink is produced by using the metallic fine particle dried powder), the temperature condition of the sintering treatment of the metallic fine particles A, and the like. The crystallite size $L_C$ can be measured by the method described in the examples.

The volume resistivity ρv of the metal film formed by the production method of the present invention is preferably 20 μΩ·cm or less, more preferably 15 μΩ·cm or less, further preferably 10 μΩ·cm or less, still further preferably 7 μΩ·cm or less, and still more further preferably 5 μΩ·cm or less, and is preferably 1 μΩ·cm or more, more preferably 1.5 μΩ·cm or more, and further preferably 2 μΩ·cm or more, from the standpoint of the production easiness of the printed matter. The volume resistivity ρv can be measured by the method described in the examples.

[Method of Producing Conductive Composite Material]

The printed matter obtained by the production method of the present invention includes a substrate and a metal film formed on the substrate, and can be used as a conductive composite material for various electric and electronic equipments since the metal film has a low volume resistivity and a small fluctuation in volume resistivity caused by temperature change. Therefore, the method of producing a printed matter described above is preferably used as a method of producing a conductive composite material including a substrate and a metal film.

The conductive composite material produced by the aforementioned method can be used in various devices, for example, an RFID tag, a capacitor, such as MLCC; an LTCC; electronic paper; an image display device, such as a liquid crystal display, an organic EL display, and a touch-sensitive panel; an organic EL device; an organic transistor; a circuit board, such as a printed circuit board and a flexible circuit board; an organic solar cell; a flexible battery; and a sensor, such as a flexible sensor.

In relation to the aforementioned embodiments, the present invention further describes the following embodiments.

<1>

A metallic fine particle-containing ink, the metal constituting the metallic fine particles containing silver, the metallic fine particles contained in the ink having a volume average particle diameter $D_A$ of 20 nm or more and 50 nm or less, and the metallic fine particles contained in the ink having a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

<2>

The metallic fine particle-containing ink according to the item <1>, the metal constituting the metallic fine particles containing silver, the content of the metallic fine particles being 2% by mass or more and 85% by mass or less, the metallic fine particles being dispersed with a polymer b, the polymer b having at least one kind selected from the group consisting of a carboxy group and a polyoxyalkylene group, the ink containing an organic solvent C and water, the total content of the organic solvent C and water being 10% by mass or more and 85% by mass or less, the mass ratio ((organic solvent C)/((organic solvent C)+(water))) of the content of the organic solvent C with respect to the total content of the organic solvent C and water being 0.05 or more and 0.9 or less, the metallic fine particles contained in the ink having a volume average particle diameter $D_A$ of 20 nm or more and 50 nm or less, and the metallic fine particles contained in the ink having a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

<3>

The metallic fine particle-containing ink according to the item <1> or <2>, the metal constituting the metallic fine particles containing silver, the content of silver in the metal constituting the metallic fine particles being 80% by mass or more, the content of the metallic fine particles being 10% by mass or more and 50% by mass or less, the metallic fine particles being dispersed with a polymer b, the polymer b containing a vinyl-based polymer containing at least one kind of a constitutional unit selected from the group consisting of a constitutional unit derived from a monomer (b-1) having a carboxy group and a constitutional unit derived from a monomer (b-2) having a polyoxyalkylene group, the mass ratio ((polymer b)/((metallic fine particles)+(polymer b))) of the content of the polymer b with respect to the total content of the metallic fine particles and the polymer b being 0.01 or more and 0.3 or less, the ink containing an organic solvent C and water, the total content of the organic solvent C and water being 10% by mass or more and 85% by mass or less, the mass ratio ((organic solvent C)/((organic solvent C)+(water))) of the content of the organic solvent C with respect to the total content of the organic solvent C and water being 0.05 or more and 0.9 or less, the organic solvent C containing propylene glycol, the metallic fine particles contained in the ink having a volume average particle diameter $D_A$ of 20 nm or more and 50 nm or less, and the metallic fine particles contained in the ink having a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

<4>

The metallic fine particle-containing ink according to any one of the items <1> to <3>, the metal constituting the metallic fine particles containing silver, the content of silver in the metal constituting the metallic fine particles being 98% by mass or more, the content of the metallic fine particles being 20% by mass or more and 40% by mass or less, the metallic fine particles being dispersed with a polymer b, the polymer b containing a vinyl-based polymer containing at least one kind of a constitutional unit selected from the group consisting of a constitutional unit derived from at least one kind selected from the group consisting of (meth)acrylic acid and maleic acid as the monomer (b-1), and a constitutional unit derived from at least one kind selected from the group consisting of polyethylene glycol (meth)acrylate, (polyethylene glycol/polypropylene glycol) (meth)acrylate, an alkoxypolyethylene glycol (meth)acrylate having an alkoxy group having 1 or more and 4 or less carbon atoms, and an alkoxy(polyethylene glycol/polypropylene glycol) (meth)acrylate having an alkoxy group having 1 or more and 8 or less carbon atoms as the monomer (b-2), the mass ratio ((polymer b)/((metallic fine particles)+(polymer b))) of the content of the polymer b with respect to the total content of the metallic fine particles and the polymer b being 0.08 or more and 0.15 or less, the ink containing an organic solvent C and water, the total content of the organic solvent C and water being 50% by mass or more and 80% by mass or less, the mass ratio ((organic solvent C)/((organic solvent C)+(water))) of the content of the organic solvent C with respect to the total content of the organic solvent C and water being 0.05 or more and 0.9 or less, the organic solvent C containing propylene glycol, the metallic fine particles contained in the ink having a volume average particle diameter $D_A$ of 20 nm or more and 50 nm or less, and the metallic fine particles contained in the ink having a ratio ($D_A/L_A$) of the volume average particle diameter $D_A$ with respect to a crystallite size $L_A$ (nm) obtained from a (111) plane in powder X-ray diffractometry of the metallic fine particles of 1.7 or more and 3.1 or less.

<5>

The metallic fine particle-containing ink according to any one of the items <2> to <4>, wherein the polymer b contains at least one kind selected from a homopolymer consisting of a constitutional unit derived from (meth)acrylic acid as the monomer (b-1), a vinyl-based polymer containing a constitutional unit derived from at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms as the monomer (b-2), and a constitutional unit derived from at least one kind selected from the group consisting of styrene and a styrene derivative as the monomer (b-3), and a vinyl-based polymer containing a constitutional unit derived from at least one kind selected from the group consisting of (meth)acrylic acid and maleic acid as the monomer (b-1), a constitutional unit derived from at least one kind selected from the group consisting of an alkoxypolyethylene glycol (meth)acrylate having an alkoxy group having 1 or more and 4 or less carbon atoms and an alkoxy(polyethylene glycol/polypropylene glycol) (meth)acrylate having an alkoxy group having 1 or more and 8 or less carbon atoms as the monomer (b-2), and a constitutional unit derived from at least one kind selected from the group consisting of styrene and a styrene derivative as the monomer (b-3).

<6>

The metallic fine particle-containing ink according to any one of the items <3> to <5>, wherein a content of propylene glycol in the organic solvent C is 80% by mass or more.

<7>

The metallic fine particle-containing ink according to any one of the items <1> to <6>, wherein the crystallite size $L_A$ is 5 nm or more and 30 nm or less.

<8>

The metallic fine particle-containing ink according to any one of the items <1> to <7>, wherein the metallic fine particles are obtained by reducing a metal raw material compound at 5° C. or more and 90° C. or less.

<9>

The metallic fine particle-containing ink according to any one of the items <3> to <8>, wherein the ink has a content of propylene glycol of 3% by mass or more and 60% by mass or less.

<10>

The metallic fine particle-containing ink according to any one of the items <1> to <9> for use in ink-jet printing.

<11>

A method of producing the metallic fine particle-containing ink according to any one of the items <1> to <10>, including the following steps 1 to 3:

step 1: a step of reducing a metal raw material compound at 5° C. or more and 90° C. or less, step 2: a step of freeze-drying a reduced product obtained in the step 1, and step 3: a step of storing a freeze-dried product obtained in the step 2 at 0° C. or more and 70° C. or less for 1 hour or more and 48 hours or less.

<12>

The method of producing a metallic fine particle-containing ink according to the item <11>, wherein the step 1 is a step of mixing a metal raw material compound, a reducing agent, and a polymer b, so as to reduce the metal raw material compound with the reducing agent, resulting in a dispersion of the metallic fine particles dispersed with the polymer b, as a reduced product.

<13>

The method of producing a metallic fine particle-containing ink according to the item <11> or (12>, wherein the method further includes the following step 4:

step 4: a step of mixing metallic fine particle dried powder obtained in the step 3 and an ink solvent to provide the metallic fine particle-containing ink.

<14>

A method of producing a printed matter, including printing the metallic fine particle-containing ink according to any one of the items <1> to <10> on a substrate, so as to provide a printed matter including the substrate having a metal film formed thereon.

<15>

The method of producing a printed matter according to the item <14>, wherein the substrate having a film of the metallic fine particle-containing ink obtained through printing is stored at 50° C. or more and 300° C. or less for 1 minute or more and 12 hours or less, so as to provide the printed matter.

<16>

The method of producing a printed matter according to the item <14> or <15>, wherein the metal film has a ratio ($L_C/L_A$) of the crystallite size $L_C$ (nm) obtained from the (111) plane in X-ray diffractometry of the metal film with respect to the crystallite size $L_A$ of 1 or more and 20 or less.

<17>

The method of producing a printed matter according to any one of the items <14> to <16>, wherein the crystallite size $L_C$ obtained from the (111) plane in X-ray diffractometry of the metal film is 10 nm or more and 250 nm or less.

<18>

A method of producing a printed matter, including printing the metallic fine particle-containing ink according to any one of the items <1> to <10> on a substrate, and then performing a sintering treatment by storing the substrate having a film of the metallic fine particle-containing ink formed thereon, so as to provide a printed matter including the substrate having a metal film formed thereon, the storing temperature and the storing time of the substrate having a film of the metallic fine particle-containing ink formed thereon being regulated to make a ratio ($L_C/L_A$) of the crystallite size $L_C$ (nm) obtained from the (111) plane in X-ray diffractometry of the metal film with respect to the crystallite size $L_A$ of 1 or more and 20 or less.

<19>

A method of producing a printed matter, including printing the metallic fine particle-containing ink according to any one of the items <1> to <10> on a substrate, and then performing a sintering treatment by storing the substrate having a film of the metallic fine particle-containing ink formed thereon, so as to provide a printed matter including the substrate having a metal film formed thereon, the storing temperature and the storing time of the substrate having a film of the metallic fine particle-containing ink formed thereon being regulated to make a crystallite size $L_C$ obtained from the (111) plane in X-ray diffractometry of the metal film of 10 nm or more and 250 nm or less.

<20>

The method of producing a printed matter according to the item <18> or <19>, wherein the storing temperature is 50° C. or more and 300° C. or less, and the storing time is 1 minute or more and 12 hours or less.

<21>

The method of producing a printed matter according to any one of the items <14> to <20>, wherein the substrate is at least one kind selected from the group consisting of a paper substrate and a substrate formed of a resin.

<22>

The method of producing a printed matter according to any one of the items <14> to <21>, wherein the metal film has a volume resistivity ρv of 10 μΩ·cm or less.

<23>

A method of producing a conductive composite material, including printing the metallic fine particle-containing ink according to any one of the items <1> to <10> on a substrate, so as to provide a conductive composite material including the substrate and a metal film.

<24>

A device including a conductive composite material produced by the production method according to the item <23>.

<25>

A method of producing a metallic fine particle-containing ink, including step 1: a step of reducing a metal raw material compound, the metal constituting the metal raw material compound containing silver, and the temperature of the reduction reaction in the step 1 being regulated in such a manner that the metallic fine particles contained in the resultant ink have a volume average particle diameter $D_A$ of 20 nm or more and 50 nm or less, and the metallic fine particles contained in the resultant ink have a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

<26>

A method of producing a metallic fine particle-containing ink, including step 1: a step of reducing a metal raw material compound, step 2: a step of freeze-drying a reduced product obtained in the step 1, and step 3: a step of storing a freeze-dried product obtained in the step 2, the metal constituting the metal raw material compound containing silver, and the temperature of the reduction reaction in the step 1, and the storing temperature and the storing time in the step 3 being regulated in such a manner that the metallic fine particles contained in the resultant ink have a volume average particle diameter $D_A$ of 20 nm or more and 50 nm or less, and the metallic fine particles contained in the resultant ink have a ratio ($D_A/L_A$) of the volume average particle diameter $D_A$ with respect to a crystallite size $L_A$ (nm) obtained from a (111) plane in powder X-ray diffractometry of the metallic fine particles of 1.6 or more and 3.1 or less.

<27>

The method of producing a metallic fine particle-containing ink according to the item <25> or <26>, wherein the temperature of the reduction reaction in the step 1 is 5° C. or more and 90° C. or less.

<28>

The method of producing a metallic fine particle-containing ink according to the item <26> or <27>, wherein the storing temperature is 0° C. or more and 70° C. or less, and the storing time is 1 hour or more and 48 hours or less, in the step 3.

EXAMPLES

In Synthesis Examples, Examples, and Comparative Examples below, "part" and "%" mean "part by mass" and "% by mass", respectively, unless otherwise indicated.

The properties were measured or calculated by the following methods.

(1) Number Average Molecular Weight Mn of Polymer b

The number average molecular weight was measured by gel permeation chromatography (GPC apparatus: HLC-8320GPC, available from Tosoh Corporation; columns: TSKgel Super AWM-H, TSKgel Super AW3000, and TSKgel guardcolumn Super AW-H, all available from Tosoh Corporation; flow rate: 0.5 mL/min) using a solution prepared by dissolving phosphoric acid and lithium bromide in N,N-dimethylformamide to make concentrations thereof of 60 mmol/L and 50 mmol/L, respectively, as an eluent, and using the monodisperse polystyrene kit having known molecular weights (PStQuick B (F-550, F-80, F-10, F-1, A-1000), PStQuick C (F-288, F-40, F-4, A-5000, A-500), all available from Tosoh Corporation, as the standard substance.

The measurement specimen used was prepared by mixing 0.1 g of the polymer b with 10 mL of the eluent in a glass vial, stirring the resulting mixture at 25° C. for 10 hours with a magnetic stirrer, and then filtering the mixture through a syringe filter (DISMIC-13HP, PTFE; 0.2 μm, available from Advantec Co., Ltd.).

(2) Mass Ratio ((Polymer b)/((Metallic Fine Particles A)+(Polymer b)))

With a simultaneous thermogravimetry/differential thermal analyzer (TG/DTA) "STA7200RV" (available from Hitachi High-Tech Science Corporation), 10 mg of the specimen was weighed on an aluminum pan, and heated from 35° C. to 550° C. at a temperature rise rate of 10° C./min, and the mass decrease under a nitrogen flow of 50 mL/min was measured. The ratio ((polymer B)/((metallic fine particles A)+(polymer B))) was calculated under assumption that the mass decrease from 200° C. to 550° C. was the mass of the polymer b, and the remaining mass at 550° C. was the mass of the metallic fine particles A.

(3) Volume Average Particle Diameter $D_A$ of Metallic Fine Particles A

The ink obtained in each of Examples and Comparative Examples was diluted with ion exchanged water to make a content of the metal of 0.1% by mass. The diluted ink was coated on a hydrophilized carbon support film "Elastic Carbon ELS-C10" (available from Okenshoji Co., Ltd.), and after spontaneously drying, an STEM image thereof was obtained with a field emission scanning electron microscope (FE-SEM) (Model: S-4800, available from Hitachi High-Tech Corporation) in the STEM mode under condition of an acceleration voltage of 30 kV. The STEM image obtained was processed with an image analyzing software "A-Zou Kun" (available from Asahi Kasei Engineering Corporation), and the volume average particle diameter $D_A$ was calculated.

(4) Crystallite Size L a of Metallic Fine Particles A 5 g of the ink obtained in each of Examples and Comparative Examples was diluted with 20 g of ion exchanged water. Subsequently, the ink was freeze-dried with a freeze-dryer (Model: FDU-2110, available from Tokyo Rikakikai Co., Ltd.) equipped with a dry chamber (Model: DRC-1000, available from Tokyo Rikakikai Co., Ltd.) under drying condition (freezing at -25° C. for 1 hour, decompressing at -10° C. for 9 hours, and decompressing at 25° C. for 5 hours, decompression degree: 5 Pa), so as to provide metallic fine particle dried powder. The resulting metallic fine particle dried powder was placed on a glass holder and measured with a powder-thin film X-ray diffractometer "Desktop X-ray Diffractometer MiniFlex" (available from Rigaku Corporation) at a rate of 10°/min in a range of 5° to 90°. The crystallite size $L_A$ obtained from the (111) plane was automatically calculated on the software (Integrated Powder X-ray Analysis Software "PDXL" (available from Rigaku Corporation)).

(5) Crystallite Size $L_C$ of Printed Matter

The printed matter obtained in each of Examples and Comparative Examples was placed on a glass holder and measured with the powder-thin film X-ray diffractometer in the same manner as in the item (4), and the crystallite size $L_C$ was automatically calculated.

(6) Measurement of Viscosity of Metallic Fine Particle-Containing Ink

The viscosity at 25° C. of the ink was measured with an E-type viscometer (available from Toki Sangyo Co., Ltd., Model No.: TV-25, Standard Cone Rotor 1° 34'×R24, rotation number: 50 rpm).

Synthesis Example 1

(Synthesis of Polymer b1)

100 g of 1,4-dioxane was placed in a 1,000 mL four-neck round-bottom flask equipped with a thermometer, two dropping funnels having a 100 mL nitrogen bypass, and a reflux device, and after increasing the inner temperature of the flask to 80° C. on an oil bath, nitrogen was bubbled therein for 10 minutes. Subsequently, 5 g of 98% acrylic acid (guaranteed reagent, available from Fujifilm Wako Pure Chemical Corporation), 30 g of methoxypolyethylene glycol (EO 9 mol) acrylate ("NK Ester AM-90G, available from Shin-Nakamura Chemical Co., Ltd.), 65 g of styrene (guaranteed reagent, available from Fujifilm Wako Pure Chemical Corporation), and 1.2 g of 3-mercaptopropionic acid (guaranteed reagent, available from Fujifilm Wako Pure Chemical Corporation) were dissolved in a resin beaker, and placed in the dropping funnel (1). Separately, 20 g of 1,4-dioxane and 0.2 g of 2,2'-azobis(2,4-dimethylvaleronitrile) ("V-65", polymerization initiator, available from Fujifilm Wako Pure Chemical Corporation) were dissolved in a resin beaker, and placed in the dropping funnel (2). Subsequently, the mixtures in the dropping funnel (1) and the dropping funnel (2) were simultaneously dropped into the flask over 90 minutes. Thereafter, after increasing the temperature inside the flask to the mixture was further agitated for 1 hour. Thereafter, the mixture was cooled to room temperature, and then distilled until the distilled matter was completed with a rotary distillation apparatus "Rotary Evaporator N-1000S" (available from Tokyo Rikakikai Co., Ltd.) at a rotation number of 50 rpm, a bath temperature of 80° C., and a pressure of 100 torr. Thereafter, the residue was dried with a vacuum dryer "VO-420" (available from Advantec Co., Ltd.) at a temperature of 110° C. and a pressure of 50 torr for 48 hours, so as to provide a polymer b1 (acrylic acid/methoxypolyethylene glycol (EO 9 mol) acrylate/styrene copolymer, acid value: 39 mgKOH/g, Mn: 7,800).

Synthesis Example 2

(Synthesis of Polymer b2)

100 g of 1,4-dioxane was placed in a 1,000 mL four-neck round-bottom flask equipped with a thermometer, two dropping funnels having a 100 mL nitrogen bypass, and a reflux device, and after increasing the inner temperature of the flask to 80° C. on an oil bath, nitrogen was bubbled therein for 10 minutes. Subsequently, 40 g of methoxypolyethylene glycol (EO 9 mol) acrylate ("NK Ester AM-90G, available from Shin-Nakamura Chemical Co., Ltd.), 60 g of styrene (guaranteed reagent, available from Fujifilm Wako Pure Chemical Corporation), and 1.1 g of 3-mercaptopropionic acid (guaranteed reagent, available from Fujifilm Wako Pure Chemical Corporation) were dissolved in a resin beaker, and placed in the dropping funnel (1). Separately, 20 g of 1,4-dioxane and 0.3 g of 2,2'-azobis(2,4-dimethylvaleronitrile) ("V-65", polymerization initiator, available from Fujifilm Wako Pure Chemical Corporation) were dissolved in a resin beaker, and placed in the dropping funnel (2). Thereafter, the mixtures in the dropping funnel (1) and the dropping funnel (2) were simultaneously dropped into the flask over 90 minutes. Thereafter, after increasing the temperature inside the flask to 90° C., the mixture was further agitated for 1 hour. Thereafter, the mixture was cooled to room temperature, and then distilled until the distilled matter was completed with a rotary distillation apparatus "Rotary Evaporator N-1000S" (available from Tokyo Rikakikai Co., Ltd.) at a rotation number of 50 rpm, a bath temperature of and a pressure of 100 torr. Thereafter, the residue was dried with a vacuum dryer "VO-420" (available from Advantec Co., Ltd.) at a temperature of 110° C. and a pressure of 50 torr for 48 hours, so as to provide a polymer b2 (methoxy-polyethylene glycol (EO 9 mol) acrylate/styrene copolymer, Mn: 11,400).

Synthesis Example 3

(Synthesis of Polymer b3)

100 g of 1,4-dioxane was placed in a 1,000 mL four-neck round-bottom flask equipped with a thermometer, two dropping funnels having a 100 mL nitrogen bypass, and a reflux device, and after increasing the inner temperature of the flask to 80° C. on an oil bath, nitrogen was bubbled therein for 10 minutes. Subsequently, 100 g of 98% acrylic acid (guaranteed reagent, available from Fujifilm Wako Pure Chemical Corporation) and 2.6 g of 3-mercaptopropionic acid (guaranteed reagent, available from Fujifilm Wako Pure Chemical Corporation) were dissolved in a resin beaker, and placed in the dropping funnel (1). Separately, 20 g of 1,4-dioxane and g of 2,2'-azobis(2,4-dimethylvaleronitrile) ("V-65", polymerization initiator, available from Fujifilm Wako Pure Chemical Corporation) were dissolved in a resin beaker, and placed in the dropping funnel (2). Thereafter, the mixtures in the dropping funnel (1) and the dropping funnel (2) were simultaneously dropped into the flask over 90 minutes. Thereafter, after increasing the temperature inside the flask to 90° C., the mixture was further agitated for 1 hour. Thereafter, the mixture was cooled to room temperature, and then distilled until the distilled matter was completed with a rotary distillation apparatus "Rotary Evaporator N-1000S" (available from Tokyo Rikakikai Co., Ltd.) at a rotation number of 50 rpm, a bath temperature of 80° C., and a pressure of 100 torr. Thereafter, the residue was dried with a vacuum dryer "VO-420" (available from Advantec Co., Ltd.) at a temperature of 110° C. and a pressure of 50 torr for 48 hours, so as to provide a polymer b3 (polyacrylic acid, acid value: 780 mgKOH/g, Mn: 5,900).

Example 1

(Step 1)

30 g of N-methyldiethanolamine (hereinafter referred to as "MDEA") as a reducing agent was placed in a 1,000 mL glass beaker, and heated to 40° C. on an oil bath under agitation with a magnetic stirrer. Separately, 140 g of silver nitrate as a metal raw material compound, 9 g of the polymer b1 as a polymer b, and 70 g of ion exchanged water were placed in a 100 mL beaker, and agitated at with a magnetic stirrer until becoming visually transparent, so as to provide a mixed liquid.

Subsequently, the resulting mixed liquid was placed in a 1,000 mL dropping funnel, and the mixed liquid was dropped into MDEA retained to 40° C. over 30 minutes. Thereafter, the reaction liquid was agitated for 5 hours while regulating the temperature of the reaction liquid to 40° C. on an oil bath, and then air-cooled to provide a dark brown dispersion containing dispersed silver fine particles (temperature of reduction reaction: 40° C.).

The entire amount of the dispersion was placed in a dialysis tube ("Spectra Por 6", available from Repligen Corporation, dialysis membrane: regenerated cellulose, molecular weight cut-off (MWCO): 50 K), and the ends of the tube were sealed with closers. The tube was immersed in 5 L of ion exchanged water in a 5 L glass beaker, which was agitated for 1 hour while retaining the temperature of water to 20 to 25° C. Thereafter, an operation of replacing the entire amount of ion exchanged water every 1 hour was repeated three times, and then specimens were sampled every 1 hour. The dialysis was terminated at the time when the mass ratio ((polymer b)/(metallic fine particles A)) calculated from the masses of the polymer b and the metallic fine particles A measured by the method using a simultaneous thermogravimetry/differential thermal analyzer (TG/DTA) in the item (2) above became 4.1/30 (i.e., the mass ratio ((polymer b)/((metallic fine particles A)+(polymer b))) =4.1/34.1), so as to provide a purified dispersion as a reduced product.

(Step 2)

The reduced product (i.e., the purified dispersion) obtained in the step 1 was freeze-dried with a freeze-dryer (Model No.: FDU-2110, available from Tokyo Rikakikai Co., Ltd.) equipped with a dry chamber (Model No.: DRC-1000, available from Tokyo Rikakikai Co., Ltd.) under drying condition (freezing at −25° C. for 1 hour, decompressing at −10° C. for 9 hours, and decompressing at 25° C. for 5 hours, decompression degree: 5 Pa), so as to provide a freeze-dried product.

(Step 3)

The freeze-dried product obtained in the step 2 was stored at 25° C. for 24 hours to provide metallic fine particle dried powder 1.

(Step 4)

34.1 g of the metallic fine particle dried powder 1, 35 g of propylene glycol as the organic acid (C), 30.8 g of ion exchanged water, and 0.1 g of an acetylene glycol-based surfactant ("Surfynol 104PG-50, available from Nisshin Chemical Co., Ltd., a propylene glycol solution of 2,4,7,9-tetramethyl-5-decyn-4,7-diol, active ingredient: 50%) were placed in a 500 mL polyethylene beaker, and dispersed with an ultrasonic dispersion device (Model: US-3001, available from Nihonseiki Kaisha Ltd.) under agitation with a magnetic stirrer for 3 hours. Thereafter, the mixture was filtered with a 5 μm disposal membrane filter (Minisart, available from Sartorius Inc.), so as to provide a metallic fine particle-containing ink I-1. The resulting ink was evaluated by the following method.

[Ink-Jet Printing]

The black cartridge was refilled with the ink, and the thus refilled black cartridge was loaded to the ink-jet printer (Model No.: Deskjet 6122, available from HP, Inc., thermal type) under the environment of a temperature of 25±1° C. and a relative humidity of 30±5%. Subsequently, the cleaning operation was performed once from the utility menu of the printer. After all the nozzles of the black head were able to jet the ink droplet with no problem, a solid black image of 204 mm in width and 275 mm in length formed with Photoshop (registered trade name) with RGB of 0,0,0 was printed with the ink-jet printer on a PET film "Lumirror S10" (available from Toray Industries, Inc., heat resisting temperature: 120° C., thickness: 50 μm, A4-size) as the substrate (printing condition: paper: photo gloss paper, mode: fine, gray scale).

Subsequently, the PET film having the ink film formed thereon was subjected to a sintering treatment by storing in an environment of a temperature of 100° C. and a humidity of 55% for 4 hours, so as to provide a printed matter including the PET film having the metal film formed thereon. The resulting printed matter was evaluated by the following methods.

Examples 2 and 3

Printed matters were obtained in the same manner as in Example 1 except that in the ink-jet printing, the sintering treatment was performed by changing the storing temperature of the substrate having the ink film formed thereon after printing from 100° C. to 85° C. in Example 2 and to 55° C. in Example 3.

Example 4

A printed matter was obtained in the same manner as in Example 1 except that in the ink-jet printing, a PEN film "Teonex Q51-A4" (available from Teijin Ltd., heat resisting temperature: 160° C., thickness: 50 μm, A4-size) was used as the substrate instead of the PET film (Lumirror S10), and the sintering treatment was performed by changing the storing temperature of the substrate having the ink film formed thereon after printing to 160° C.

Example 5

Metallic fine particle dried powder 2 was obtained in the same manner as in Example 1 except that in the step 1, the temperature of the reduction reaction was changed from 40° C. to 90° C., and the reduction reaction was performed under refluxing. Subsequently, a metallic fine particle-containing ink and a printed matter were obtained in the same manner as in Example 1 except that in the step 4, the metallic fine particle dried powder 2 was used instead of the metallic fine particle dried powder 1.

Example 6

Metallic fine particle dried powder 3 was obtained in the same manner as in Example 1 except that in the step 1, the temperature of the reduction reaction was changed from 40° C. to 10° C. Subsequently, a metallic fine particle-containing ink and a printed matter were obtained in the same manner as in Example 1 except that in the step 4, the metallic fine particle dried powder 3 was used instead of the metallic fine particle dried powder 1.

Examples 7 and 8

Metallic fine particle dried powder 4 and 5 were obtained in the same manner as in Example 1 except that in the step 3, the freeze-dried product obtained through freeze-drying was stored in a refrigerator at 0° C. for 24 hours for Example 7, and stored in a dryer at 60° C. for 8 hours for Example 8. Subsequently, metallic fine particle-containing inks and printed matters were obtained in the same manner as in Example 1 except that in the step 4, the metallic fine particle dried powder 4 and 5 were used instead of the metallic fine particle dried powder 1.

Examples 9 and 10

Metallic fine particle-containing inks and printed matters were obtained in the same manner as in Example 1 except that in the step 4, the contents of propylene glycol and water in the ink were changed to the amounts shown in Table 1.

Examples 11 to 13

Metallic fine particle dried powder 6 to 8 were obtained in the same manner as in Example 1 except that in the step 1, the kind of the polymer b was changed to the polymers shown in Table 1. Subsequently, metallic fine particle-containing inks and printed matters were obtained in the same manner as in Example 1 except that in the step 4, the metallic fine particle dried powder 6 to 8 were used instead of the metallic fine particle dried powder 1. The polymer b4 was as follows.

Polymer b4: an absolutely dried product of an aqueous solution of an acrylic acid/maleic acid/alkoxy(polyethylene glycol/polypropylene glycol) acrylate (number of alkylene oxide unit: 32 mol, molar ratio (EO/PO): 75/25)/styrene copolymer having a solid content of 40% (DISPERBYK-190, a trade name, available from BYK GmbH) (number average molecular weight Mn: 4,500, acid value: 20 mgKOH/g)

Example 14

A printed matter was obtained in the same manner as in Example 1 except that in the ink-jet printing, the PET film having the ink film formed thereon was subjected to a sintering treatment by storing in an environment at a temperature of 100° C. and a humidity of 55% for 1 minute.

Comparative Examples 1 and 2

Metallic fine particle dried powder 51 to 52 were obtained in the same manner as in Example 1 except that the content of the polymer b in the resulting ink became the amount shown in Table 1, i.e., in the step 1, the amount of the polymer b was changed to 7.9 g for Comparative Example 1, and the amount of the polymer b was changed to 1.9 g for Comparative Example 2. Subsequently, metallic fine particle-containing inks and printed matters were obtained in the same manner as in Example 1 except that in the production of ink, the metallic fine particle dried powder 51 to 52 were used instead of the metallic fine particle dried powder 1.

Comparative Example 3

Metallic fine particle dried powder 53 was obtained in the same manner as in Example 1 except that in the step 1, the temperature of the reduction reaction was changed from 40° C. to 92° C. Subsequently, a metallic fine particle-containing ink and a printed matter were obtained in the same manner as in Example 1 except that in the step 4, the metallic fine particle dried powder 53 was used instead of the metallic fine particle dried powder 1.

Comparative Example 4

Metallic fine particle dried powder 54 was obtained in the same manner as in Example 1 except that in the step 1, the reduction reaction was performed below freezing point (0° C. or less). Subsequently, a metallic fine particle-containing ink and a printed matter were obtained in the same manner as in Example 1 except that in the step 4, the metallic fine particle dried powder 54 was used instead of the metallic fine particle dried powder 1.

Comparative Example 5

A printed matter was obtained in the same manner as in Example 1 except that an ink produced according to Example 1 of JP 2008-4375 A was used.

Comparative Example 6

A printed matter was obtained in the same manner as in Example 1 except that a commercially available silver nano-particle ink "NBSIJ-KC01" (available from Mitsubishi Paper Mills, Ltd.) was used and printed two times in the formation of an ink film in the ink-jet printing, in which the applied amount of silver per unit area was matched to Example 1.

<Evaluation>

[Evaluation of Storage Stability]

40 g of the ink was sealed in a glass vial No. 7 (capacity: 50 mL), available from Maruemu Corporation, and stored in a thermostat chamber at 50° C. for 60 days. Thereafter, the ink was allowed to stand at ordinary temperature (25° C.) for 1 day, and the viscosity of the stored ink was measured in the same manner as described above. The viscosity retention rate before and after storing was calculated according to the following expression, and designated as an index of the storage stability of the ink. The results are shown in Table 2. A viscosity retention rate closer to 100% means excellent storage stability.

Viscosity retention rate (%)=((viscosity after storing (mPa·s))/(viscosity before storing (mPa·s)))×100

[Measurement of Volume Resistivity Before and After Cycle Test]

The printed matter obtained in each of Examples and Comparative Examples was processed with a cross section polisher "IB-19520CCP" (available from JEOL, Ltd.), so as to provide a test piece having a flat cross sectional surface. Subsequently, the test piece was attached to an SEM stage (Type T, available from Nisshin EM Co., Ltd.) with a double-sided adhesive tape with an aluminum substrate for SEM (catalog No. 732, available from Nisshin EM Co., Ltd.), and the cross sectional surface was observed with a field emission scanning electron microscope "FE-SEM" (available from Hitachi High-Tech Corporation, Model: S-4800) in the SEM mode under condition of an acceleration voltage of 10 kV, so as to provide a secondary electron image. The thickness of the metal film was measured at 10 points on the metal film in the secondary electron image, and the thickness t of the metal image was obtained by arithmetic average.

Subsequently, the test piece was measured with a resistivity meter (main unit: Loresta GP, four-needle probe: PSP Probe, all available from Mitsubishi Chemical Analytech Co., Ltd.), to which the thickness t of the metal film measured above was input to display the volume resistivity. The same measurement was performed on other positions of the test piece, and the volume resistivity ρv (1) before the cycle test was obtained by arithmetic average of 10 points in total.

Subsequently, the test piece was mounted on a cycle tester "ETAC" (Model: C TH412E, available from Kusumoto Chemicals, Ltd.), and subjected to 1,000 cycles of a cycle of retaining at −40° C. and 120° C. each for 10 minutes, followed by taking out therefrom. Thereafter, the volume resistivity ρv (2) after the cycle test was measured in the same manner as above, and the change rate of the volume resistivity ρv before and after the cycle test was obtained according to the following expression. The results are shown in Table 2. A change rate of the volume resistivity ρv closer to 100% means a smaller fluctuation in volume resistivity caused by temperature change.

Change rate of volume resistivity ρv(%)=((volume resistivity ρv (2) after cycle test)/(volume resistivity ρv (1)before cycle test))×100

[Evaluation of Jetting Stability]

After printing with the ink-jet printer, the nozzle surface was allowed to stand for 120 minutes without protecting the nozzle surface, and then a print check pattern capable of judging the presence of jetting from all the nozzles was printed on a substrate, in which the number of clogged nozzles (i.e., the nozzles not discharging normally) was counted for evaluating the jetting stability. The results are shown in Table 2. A smaller number of clogged nozzles means better jetting stability.

TABLE 1

| | | | Metallic fine particle-containing ink | | | | | | | |
| | | | Production condition of metallic fine particle-containing ink | | | | Metallic fine particles A | | | |
| | | | | Step 1 | Step 3 | | Metallic fine particle | | | Volume average particle | Crystallite |
| | | Kind | Reducing temperature (° C.) | Storing temperature (° C.) | Storing time (h) | dried powder Kind | Kind of metal | Kind of polymer b | diameter $D_A$ (nm) | size $L_A$ (nm) |
|---|---|---|---|---|---|---|---|---|---|---|
| Example | 1 | I-1 | 40 | 25 | 24 | 1 | silver | b1 | 27 | 14 |
| | 2 | I-1 | 40 | 25 | 24 | 1 | silver | b1 | 27 | 14 |
| | 3 | I-1 | 40 | 25 | 24 | 1 | silver | b1 | 27 | 14 |

US 12,577,419 B2

41    42

TABLE 1-continued

|  |  |  |  |  |  |  |  |  |  |  |
|---|---|---|---|---|---|---|---|---|---|---|
|  | 4 | I-1 | 40 | 25 | 24 | 1 | silver | b1 | 27 | 14 |
|  | 5 | I-2 | 90 | 25 | 24 | 2 | silver | b1 | 22 | 8 |
|  | 6 | I-3 | 10 | 25 | 24 | 3 | silver | b1 | 47 | 27 |
|  | 7 | I-4 | 40 | 0 | 24 | 4 | silver | b1 | 23 | 11 |
|  | 8 | I-5 | 40 | 60 | 8 | 5 | silver | b1 | 38 | 22 |
|  | 9 | I-6 | 40 | 25 | 24 | 1 | silver | b1 | 27 | 14 |
|  | 10 | I-7 | 40 | 25 | 24 | 1 | silver | b1 | 27 | 14 |
|  | 11 | I-8 | 40 | 25 | 24 | 6 | silver | b2 | 35 | 17 |
|  | 12 | I-9 | 40 | 25 | 24 | 7 | silver | b3 | 39 | 18 |
|  | 13 | I-10 | 40 | 25 | 24 | 8 | silver | b4 | 31 | 15 |
|  | 14 | I-1 | 40 | 25 | 24 | 1 | silver | b1 | 27 | 14 |
| Comparative | 1 | I-C1 | 40 | 25 | 24 | 51 | silver | b1 | 18 | 10 |
| Example | 2 | I-C2 | 40 | 25 | 24 | 52 | silver | b1 | 55 | 29 |
|  | 3 | I-C3 | 92 | 25 | 24 | 53 | silver | b1 | 30 | 20 |
|  | 4 | I-C4 | ≤0° C. | 25 | 24 | 54 | silver | b1 | 32 | 10 |
|  | 5 | I-C5 | — | — | — | — | silver | — | 20 | 6 |
|  | 6 | I-C6 | — | — | — | — | silver | — | 15 | 9 |

Metallic fine particle-containing ink

| | | Metallic fine particles A Ratio (D_A/L_A) | Metallic fine particles A | Dispersant B (polymer b) | Organic solvent C PG *1 | Ion exchanged water | Surfactant *2 | Mass ratio (b/(A+b)) *3 | Mass ratio (C/(C+water)) *4 | Viscosity of ink (mPa·s) |
|---|---|---|---|---|---|---|---|---|---|---|
| Example | 1 | 1.93 | 30 | 4.1 | 35.05 | 30.8 | 0.05 | 0.12 | 0.53 | 7.3 |
|  | 2 | 1.93 | 30 | 4.1 | 35.05 | 30.8 | 0.05 | 0.12 | 0.53 | 7.3 |
|  | 3 | 1.93 | 30 | 4.1 | 35.05 | 30.8 | 0.05 | 0.12 | 0.53 | 7.3 |
|  | 4 | 1.93 | 30 | 4.1 | 35.05 | 30.8 | 0.05 | 0.12 | 0.53 | 7.3 |
|  | 5 | 2.75 | 30 | 4.1 | 35.05 | 30.8 | 0.05 | 0.12 | 0.53 | 6.8 |
|  | 6 | 1.74 | 30 | 4.1 | 35.05 | 30.8 | 0.05 | 0.12 | 0.53 | 9.1 |
|  | 7 | 2.09 | 30 | 4.1 | 35.05 | 30.8 | 0.05 | 0.12 | 0.53 | 8.1 |
|  | 8 | 1.73 | 30 | 4.1 | 35.05 | 30.8 | 0.05 | 0.12 | 0.53 | 9.4 |
|  | 9 | 1.93 | 30 | 4.1 | 4.05 | 61.8 | 0.05 | 0.12 | 0.06 | 6.5 |
|  | 10 | 1.93 | 30 | 4.1 | 53.05 | 12.8 | 0.05 | 0.12 | 0.81 | 8.4 |
|  | 11 | 2.06 | 30 | 4.1 | 35.05 | 30.8 | 0.05 | 0.12 | 0.53 | 7.8 |
|  | 12 | 2.17 | 30 | 4.1 | 35.05 | 30.8 | 0.05 | 0.12 | 0.53 | 9.1 |
|  | 13 | 2.07 | 30 | 4.1 | 35.05 | 30.8 | 0.05 | 0.12 | 0.53 | 7.5 |
|  | 14 | 1.93 | 30 | 4.1 | 35.05 | 30.8 | 0.05 | 0.12 | 0.53 | 7.3 |
| Comparative | 1 | 1.80 | 30 | 7.9 | 35.05 | 27.0 | 0.05 | 0.21 | 0.56 | 6.9 |
| Example | 2 | 1.90 | 30 | 1.9 | 35.05 | 33.0 | 0.05 | 0.06 | 0.52 | 8.7 |
|  | 3 | 1.50 | 30 | 4.1 | 35.05 | 30.8 | 0.05 | 0.12 | 0.53 | 7.6 |
|  | 4 | 3.20 | 30 | 4.1 | 35.05 | 30.8 | 0.05 | 0.12 | 0.53 | 7.4 |
|  | 5 | 3.33 | 32 | 6.0 | — | — | — | — | — | 6.3 |
|  | 6 | 1.67 | 15 | 0.9 | — | — | — | — | — | 8.6 |

Printed matter

| | | Storing temperature (° C.) | Storing time | Kind | Heat resisting temperature (° C.) | Crystallite size L_C (nm) | Ratio (L_C/L_A) |
|---|---|---|---|---|---|---|---|
| Example | 1 | 100 | 4 h | Lumirror S10 | 120 | 38 | 2.71 |
|  | 2 | 85 | 4 h | Lumirror S10 | 120 | 26 | 1.86 |
|  | 3 | 55 | 4 h | Lumirror S10 | 120 | 71 | 5.07 |
|  | 4 | 160 | 4 h | Teonex Q51-A4 | 160 | 38 | 2.71 |
|  | 5 | 100 | 4 h | Lumirror S10 | 120 | 19 | 2.38 |
|  | 6 | 100 | 4 h | Lumirror S10 | 120 | 67 | 2.48 |
|  | 7 | 100 | 4 h | Lumirror S10 | 120 | 25 | 2.27 |
|  | 8 | 100 | 4 h | Lumirror S10 | 120 | 211 | 9.59 |
|  | 9 | 100 | 4 h | Lumirror S10 | 120 | 38 | 2.71 |
|  | 10 | 100 | 4 h | Lumirror S10 | 120 | 38 | 2.71 |
|  | 11 | 100 | 4 h | Lumirror S10 | 120 | 41 | 2.41 |
|  | 12 | 100 | 4 h | Lumirror S10 | 120 | 45 | 2.50 |
|  | 13 | 100 | 4 h | Lumirror S10 | 120 | 40 | 2.67 |
|  | 14 | 100 | 1 min | Lumirror S10 | 120 | 28 | 2.00 |
| Comparative | 1 | 100 | 4 h | Lumirror S10 | 120 | 29 | 2.90 |
| Example | 2 | 100 | 4 h | Lumirror S10 | 120 | 101 | 3.48 |
|  | 3 | 100 | 4 h | Lumirror S10 | 120 | 54 | 2.70 |
|  | 4 | 100 | 4 h | Lumirror S10 | 120 | 35 | 3.50 |

TABLE 1-continued

| | | | | | | |
|---|---|---|---|---|---|---|
| 5 | 100 | 4 h | Lumirror S10 | 120 | 32 | 5.33 |
| 6 | 100 | 4 h | Lumirror S10 | 120 | 51 | 5.67 |

*1: Propylene glycol (The content (% by mass) in table includes the content carried in by Surfynol 104PG-50)
*2: Surfynol 104PG-50 (The content (% by mass) in table is the active ingredient)
*3: Mass ratio ((polymer b)/((metallic fine particles A) + (polymer b))) of content of polymer b with respect to total content of metallic fine particles A and polymer b in metallic fine particle-containing ink
*4: Mass ratio ((organic solvent C)/((organic solvent C) + (water))) of content of organic solvent C with respect to total content of organic solvent C and water in metallic fine particle-containing ink

TABLE 2

| | | Storage stability | | Volume resistivity | | | Jetting stability |
|---|---|---|---|---|---|---|---|
| | | Viscosity of ink after storing mPa·s | Viscosity retention rate % | Volume resistivity ρv (1) before cycle test μΩ·cm | Volume resistivity ρv (2) after cycle test μΩ·cm | Change rate of volume resistivity ρv before and after cycle test % | Number of clogged nozzles — |
| Example | 1 | 7.2 | 99 | 3.3 | 3.6 | 109 | 0 |
| | 2 | 7.2 | 99 | 15.8 | 18.1 | 115 | 0 |
| | 3 | 7.2 | 99 | 11.6 | 12.9 | 111 | 0 |
| | 4 | 7.2 | 99 | 14.4 | 17.1 | 119 | 0 |
| | 5 | 7.3 | 107 | 9.9 | 11.6 | 117 | 6 |
| | 6 | 9.6 | 105 | 13.2 | 14.2 | 108 | 3 |
| | 7 | 8.5 | 105 | 10.3 | 12.2 | 118 | 0 |
| | 8 | 9.8 | 104 | 8.2 | 9.0 | 110 | 0 |
| | 9 | 6.7 | 103 | 8.9 | 9.1 | 102 | 5 |
| | 10 | 8.6 | 102 | 7.9 | 8.6 | 109 | 4 |
| | 11 | 8.6 | 110 | 9.1 | 9.2 | 101 | 2 |
| | 12 | 10.2 | 112 | 8.5 | 9.2 | 108 | 6 |
| | 13 | 7.6 | 101 | 4.2 | 4.4 | 105 | 1 |
| | 14 | 7.2 | 99 | 15.7 | 16.5 | 105 | 0 |
| Comparative Example | 1 | 8.1 | 117 | 52.3 | 79.2 | 151 | 27 |
| | 2 | 12.0 | 138 | 47.1 | 69.3 | 147 | 41 |
| | 3 | 9.1 | 120 | 51.2 | 71.2 | 139 | 38 |
| | 4 | 9.2 | 124 | 56.3 | 80.9 | 144 | 49 |
| | 5 | 12.8 | 203 | 62.9 | 99.3 | 158 | 32 |
| | 6 | 18.3 | 213 | 58.8 | 102.6 | 174 | 51 |

It is understood from Table 2 that, as compared to Comparative Examples 1 to 6, the inks of Examples 1 to 14 are excellent in storage stability and jetting stability, and is capable of forming a metal film that has a low volume resistivity due to the small value of the volume resistivity ρv (1) before the cycle test and has a small fluctuation in volume resistivity caused by temperature change due to the change rate of the volume resistivity ρv close to 100%.

INDUSTRIAL APPLICABILITY

The present invention can provide a metallic fine particle-containing ink that is excellent in storage stability under an environment at ordinary temperature or more, and is excellent in jetting stability in application to ink-jet printing, and can provide a printed matter having a metal film having a low volume resistivity and a small fluctuation in volume resistivity caused by temperature change. Accordingly, the metallic fine particle-containing ink and the printing method using the ink can be favorably applied to various fields using printed electronics.

The invention claimed is:

1. A metallic fine particle-containing ink, comprising:
a metal constituting the metallic fine particles comprising silver, the metallic fine particles contained in the ink having a volume average particle diameter $D_A$ of 20 nm or more and 50 nm or less, the metallic fine particles contained in the ink having a ratio $(D_A/L_A)$ of the volume average particle diameter $D_A$ with respect to a crystallite size $L_A$ (nm) obtained from a (111) plane in powder X-ray diffractometry of the metallic fine particles of 1.7 or more and 2.5 or less, the metallic fine particles are dispersed with a polymer b, and the polymer b has at least one selected from the group consisting of a carboxy group and a polyoxyalkylene group.

2. The metallic fine particle-containing ink according to claim 1, wherein the crystallite size $L_A$ is 5 nm or more and 30 nm or less.

3. The metallic fine particle-containing ink according to claim 1, wherein the metallic fine particle-containing ink has a mass ratio ((polymer b)/((metallic fine particles A)+(polymer b))) of a content of the polymer b with respect to a total content of the metallic fine particles A and the polymer b of 0.01 or more and 0.3 or less.

4. The metallic fine particle-containing ink according to claim 1, further comprising an organic solvent C and water, and has a mass ratio ((organic solvent C)/((organic solvent C)+(water))) of a content of the organic solvent C with respect to a total content of the organic solvent C and water of 0.05 or more and 0.9 or less.

5. The metallic fine particle-containing ink according to claim 1, wherein the metallic fine particle-containing ink has a content of the metallic fine particles of 2% by mass or more and 85% by mass or less.

6. The metallic fine particle-containing ink according to claim 4, wherein the metallic fine particle-containing ink has a total content of the organic solvent C and water of 10% by mass or more and 85% by mass or less.

7. The metallic fine particle-containing ink according to claim 4, wherein the organic solvent C comprises propylene glycol.

8. A method of ink-jet printing, wherein the ink is the metallic fine particle-containing ink according to claim 1.

9. A method of producing the metallic fine particle-containing ink according to claim 1, comprising:

reducing a metal raw material compound at 5° C. or more and 90° C. or less to form a reduced product, freeze-drying the reduced product to form a freeze-dried product, and storing the freeze-dried product at 0° C. or more and 70° C. or less for 1 hour or more and 48 hours or less.

10. A method of producing a printed matter, comprising printing the metallic fine particle-containing ink according to claim 1 on a substrate, so as to provide a printed matter including the substrate having a metal film formed thereon.

11. The method of producing a printed matter according to claim 10, wherein the substrate having a film of the metallic fine particle-containing ink obtained through printing is stored at 50° C. or more and 300° C. or less for 1 minute or more and 12 hours or less, so as to provide the printed matter.

12. The method of producing a printed matter according to claim 10, wherein the metal film has a ratio ($L_C/L_A$) of a crystallite size $L_C$ (nm) obtained from a (111) plane in X-ray diffractometry of the metal film with respect to the crystallite size $L_A$ of 1 or more and 20 or less.

13. The method of producing a printed matter according to claim 10, wherein the metal film has a crystallite size $L_C$ obtained from a (111) plane in X-ray diffractometry of the metal film of 10 nm or more and 250 nm or less.

14. The method of producing a printed matter according to claim 10, wherein the substrate is at least one selected from the group consisting of a paper substrate and a substrate formed of a resin.

15. A method of producing a conductive composite material, comprising printing the metallic fine particle-containing ink according to claim 1 on a substrate, so as to provide a conductive composite material including the substrate and a metal film.

16. A device comprising a conductive composite material produced by the production method according to claim 15.

17. The metallic fine particle-containing ink according to claim 4, wherein the metallic fine particle-containing ink has a content of water of 5% by mass or more and 65% by mass or less.

18. The metallic fine particle-containing ink according to claim 7, wherein the metallic fine particle-containing ink has a content of propylene glycol of 3% by mass or more and 60% by mass or less.

19. The metallic fine particle-containing ink according to claim 7, wherein the metallic fine particle-containing ink has a mass ratio ((propylene glycol)/((propylene glycol)+(water))) of the content of the propylene glycol with respect to a total content of propylene glycol and water of 0.05 or more and 0.9 or less.

* * * * *